(12) United States Patent  (10) Patent No.: US 11,853,026 B2
Tu et al. (45) Date of Patent: Dec. 26, 2023

(54) CONFIGURABLE DISTRIBUTED-INTERLOCK-SYSTEM

(71) Applicant: Lam Research Corporation, Fremont, CA (US)

(72) Inventors: Eric Tu, San Jose, CA (US); Dirk Rudolph, Dundee, OR (US); Ales Janhar, Fremont, CA (US); John Folden Stumpf, Portland, OR (US); Justin Remulla, Union City, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 17/052,778

(22) PCT Filed: May 6, 2019

(86) PCT No.: PCT/US2019/030918
§ 371 (c)(1),
(2) Date: Nov. 3, 2020

(87) PCT Pub. No.: WO2019/217315
PCT Pub. Date: Nov. 14, 2019

(65) Prior Publication Data
US 2021/0232115 A1   Jul. 29, 2021

Related U.S. Application Data

(60) Provisional application No. 62/667,865, filed on May 7, 2018.

(51) Int. Cl.
*G05B 19/05* (2006.01)
*G05B 19/042* (2006.01)

(52) U.S. Cl.
CPC ....... *G05B 19/058* (2013.01); *G05B 19/0421* (2013.01); *G05B 19/0425* (2013.01); *G05B 19/0426* (2013.01)

(58) Field of Classification Search
CPC .............. G05B 19/058; G05B 19/0421; G05B 19/0425; G05B 19/0426; G05B 9/03; G05B 19/102; G05B 19/406; G05B 19/41865
See application file for complete search history.

(56) References Cited

U.S. PATENT DOCUMENTS 6,510,351 B1   1/2003  Blevins et al.
6,952,618 B2  10/2005  Davlin et al.
(Continued)

FOREIGN PATENT DOCUMENTS

CN   101393430 A   3/2009
CN   101471555 A   7/2009
(Continued)

OTHER PUBLICATIONS

"International Application Serial No. PCT US2019 030918, International Preliminary Report on Patentability dated Nov. 19, 2020", 8 pages.
(Continued)

*Primary Examiner* — Kenneth M Lo
*Assistant Examiner* — Mohammed Shafayet
(74) *Attorney, Agent, or Firm* — Schwegman Lundberg & Woessner, P.A.

(57) ABSTRACT

Various embodiments include methods and apparatuses to provide human safety and machine safety and operations. In one example, a distributed interlock system includes at least one master device coupled to a number of slave device. The slave devices receive signals from one or more tools and provide the signals to the master device. The master device evaluates the signals and prevents unsafe conditions prior to one or more command executions, related to the unsafe conditions, being transmitted to one or more of the slave devices. Other methods and systems are disclosed.

20 Claims, 16 Drawing Sheets

(56) References Cited

U.S. PATENT DOCUMENTS

| | | | |
|---|---|---|---|
| 2004/0015336 A1 | 1/2004 | Kulesz et al. | |
| 2004/0039456 A1 | 2/2004 | Davlin et al. | |
| 2006/0187017 A1* | 8/2006 | Kulesz | G08B 21/12 340/506 |
| 2007/0055388 A1 | 3/2007 | Araki et al. | |
| 2007/0203586 A1* | 8/2007 | Sakurai | G05B 15/02 700/3 |
| 2008/0078189 A1* | 4/2008 | Ando | F25B 49/00 62/55.5 |
| 2008/0177397 A1* | 7/2008 | Davlin | G05B 19/0421 700/3 |
| 2008/0302434 A1 | 12/2008 | Taskar | |
| 2009/0095354 A1 | 4/2009 | Taskar | |
| 2009/0171472 A1* | 7/2009 | Teranisi | G05B 19/0428 700/3 |
| 2010/0096031 A1 | 4/2010 | Okase et al. | |
| 2011/0127853 A1* | 6/2011 | Fujita | G01D 4/004 307/131 |
| 2013/0092704 A1* | 4/2013 | Tincher | D06F 39/02 417/474 |
| 2013/0307558 A1* | 11/2013 | Klapper | G01R 31/00 324/537 |
| 2014/0110940 A1 | 4/2014 | Ridgway et al. | |
| 2014/0324233 A1 | 10/2014 | Takakura et al. | |
| 2015/0075660 A1 | 3/2015 | Inada et al. | |
| 2016/0092388 A1 | 3/2016 | Sorenson et al. | |
| 2017/0075336 A1 | 3/2017 | Ueda | |
| 2017/0277607 A1* | 9/2017 | Samii | G06F 11/2028 |
| 2018/0011466 A1* | 1/2018 | Murayama | H04B 3/54 |
| 2019/0072989 A1* | 3/2019 | Nagai | G05D 16/204 |
| 2022/0199431 A1 | 6/2022 | Stumpf et al. | |

FOREIGN PATENT DOCUMENTS

| | | |
|---|---|---|
| CN | 103323693 A | 9/2013 |
| CN | 107229221 A | 10/2017 |
| CN | 107407922 A | 11/2017 |
| CN | 112368653 | 2/2021 |
| CN | 113994460 A | 1/2022 |
| JP | 2000293207 | 10/2000 |
| JP | 2001337706 | 12/2001 |
| JP | 2003084801 A | 3/2003 |
| JP | 2009176275 | 8/2009 |
| JP | 2014084870 | 5/2014 |
| JP | 2014215830 | 11/2014 |
| JP | 2021523462 | 9/2021 |
| JP | 2022529263 A | 6/2022 |
| WO | WO-9825058 A1 | 6/1998 |
| WO | 2008075631 | 6/2008 |
| WO | WO-2020214616 A1 | 10/2020 |

OTHER PUBLICATIONS

"International Application Serial No. PCT US2020 028158, International Preliminary Report on Patentability dated Oct. 28, 2021", 13 pages.

International Application Serial No. PCT/US2019/030918, International Search Report dated Aug. 20, 2019, 3 pgs.

International Application Serial No. PCT/US2019/030918, Written Opinion dated Aug. 20, 2019, 6 pgs.

International Application Serial No. PCT/US2020/028158, International Search Report dated Jul. 29, 2020, 3 pgs.

International Application Serial No. PCT/US2020/028158, Written Opinion dated Jul. 29, 2020, 11 pgs.

"Japanese Application Serial No. 2020-562728, Notification of Reasons for Refusal dated Jan. 24, 2023", w English translation., 10 pgs.

"Taiwanese Application Serial No. 108115700, Office Action dated Mar. 24, 2023", w English claims, 13 pgs.

Chinese Application Serial No. 201980044489.3, Office Action dated Oct. 16, 2023, W/ English Translation, 12 pgs.

Japanese Application Serial No. 2020-562728, Notification of Reasons for Rejection dated Aug. 15, 2023, W/English Translation, 10 pgs.

"Japanese Application Serial No. 2020-562728, Response filed May 25, 2023 to Notification of Reasons for Refusal dated Jan. 24, 2023", w English claims, 16 pgs.

"Taiwanese Application Serial No. 108115700, Response filed Jun. 19, 2023 to Office Action dated Mar. 24, 2023", w English claims, 39 pgs.

* cited by examiner

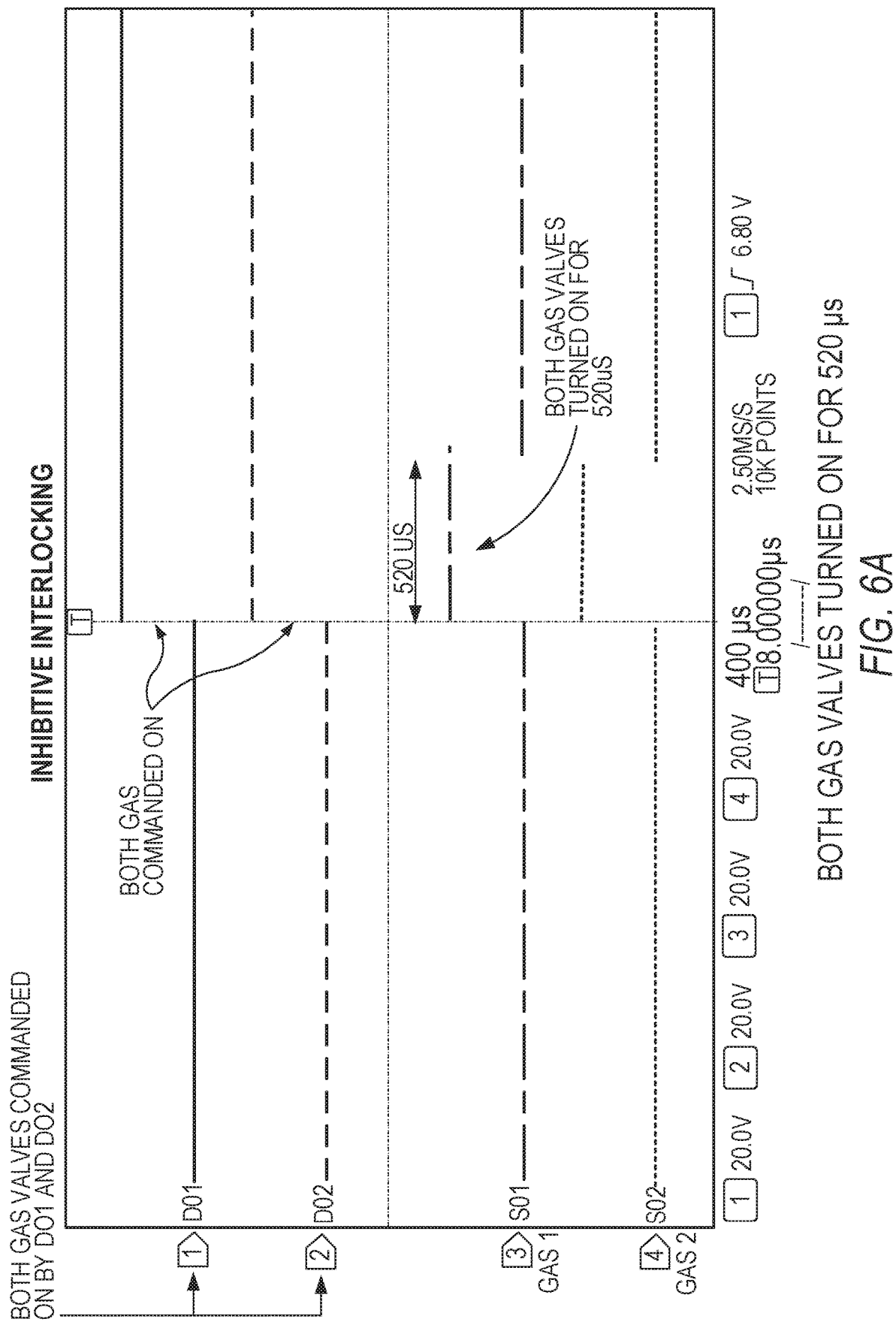

CONFIGURABLE DISTRIBUTED-INTERLOCK-SYSTEM

CLAIM OF PRIORITY

This application is a U.S. National Stage Filing under 35 U.S.C. 371 from International Application No. PCT/US2019/030918, filed on May 6, 2019, and published as WO 2019/217315 A1 on Nov. 14, 2019, which claims the benefit of priority to U.S. Patent Application No. 62/667,865, filed on May 7, 2018, each of which is incorporated by reference herein in its entirety.

TECHNICAL FIELD

The subject matter disclosed herein relates to control systems, providing operational signals, and safety interlocks. More specifically, the disclosed subject matter relates to both machine safety and human safety around machine tools and safety from tool-to-tool.

BACKGROUND

The current status quo of control systems uses relay-based safety interlocks. The fastest commercially-available interlocking mechanism is the "Safety over EtherCAT (Ethernet for Control Automation Technology)" system. However, even with the "Safety over EtherCAT" implementation, the interlock evaluation adds latency to the input/output (I/O) cycle time, which renders contemporaneous implementations unusable for advanced machine tool applications.

Currently, the EtherCAT standard is an Ethernet-based fieldbus system. One type of system is available from Beckhoff Automation (Beckhoff Automation GmbH & Co. KG; Huelshorstweg 20 33415 Verl Germany). The protocol for such a system is standardized in International Electrotechnical Commission (IEC) standard 61158 and is used for both hard and soft real-time computing requirements in automation technology. Therefore, currently, tools in a semiconductor fabrication environment generally have EtherCAT or other Ethernet-based control architecture connectivity built in or added onto the tool. However, contemporaneous implementations of the EtherCAT standard and related technologies are not meeting all requirements for human safety and proper tool operation.

The information described in this section is provided to offer the skilled artisan a context for the following disclosed subject matter and should not be considered as admitted prior art.

BRIEF DESCRIPTION OF THE FIGURES

FIG. 6A shows an example of inhibitive interlocking according to various exemplary embodiments;

DETAILED DESCRIPTION

Figure 1A:
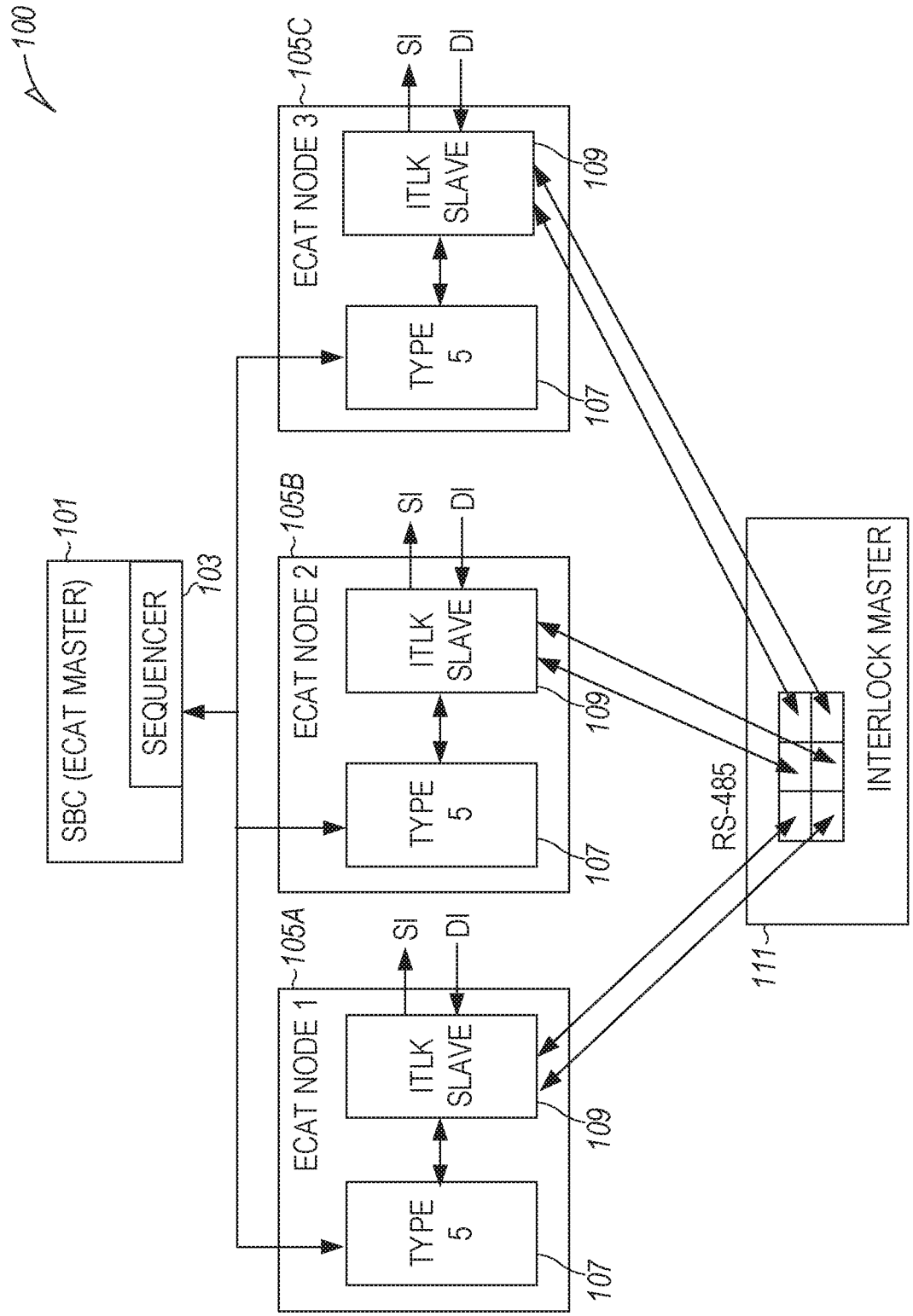
FIG. 1A shows an example of a high-level overview of a control automation technology (CAT) control system with distributed interlock (ITLK) system components, according to various exemplary embodiments.

The disclosed subject matter will now be described in detail with reference to a few general and specific embodiments as illustrated in various ones of the accompanying drawings. In the following description, numerous specific details are set forth in order to provide a thorough understanding of the disclosed subject matter. It will be apparent, however, to one skilled in the art, that the disclosed subject matter may be practiced without some or all of these specific details. In other instances, well-known process steps or structures have not been described in detail so as not to obscure the disclosed subject matter.

Particular Nomenclature of Abbreviations and Acronyms Used Herein Includes

ASIC: Application-Specific Integrated Circuit;
CAT: Control Automation Technology;
DI: Digital Input;
DO: Intended Digital Output to drive;

EtherCAT: Ethernet for Control Automation Technology
FPGA: Field-Programmable Gate Array;
ITLK: Interlock;
EtherCAT: A specific exemplary embodiment of a hardware platform that can run an EtherCAT protocol software and/or firmware and that adheres to EtherCAT standards as developed under IEEE 802 standards;
RS-485: A well-known serial-communications protocol (also known as Telecommunications Industry Association standard TIA-485, and Electronic Industries Alliance standard EIA-485) is a standard defining the electrical characteristics of drivers and receivers for use in serial communications systems shown herein as being used mainly for convenience in understanding. Upon reading and understanding the disclosure provided herein, the person of ordinary skill in the art will recognize that other types of communications protocols may be employed as well;
SBC: Single-Board Computer;
SO: Expected value of the output;
SI: Actual value of the output (a read back of SO); and
Type 5: An example of one type of interface translation card. However, a person of ordinary skill in the art will recognize, upon reading and understanding the disclosure provided herein, that other types of interface cards could readily be substituted as well.

The disclosed subject matter supports distributed interlocking that is safety certified according to the IEC 61508 standard. The distributed interlock system disclosed herein allows any DI and any DO across an entire system to be used in interlock calculations. As an example, an over-temperature OK DI from the bottom of a module can be used to interlock heater-power enable on the top of the module on a different node. This is accomplished without routing DIOs between the nodes. In addition, preventative interlocking evaluates the interlock conditions and prevents unsafe conditions before command execution. The interlocks are, for example, firmware configurable, which allows for updating any or all equations without needing to redesign, for example, printed-circuit boards (PCBs) and/or cables and also without requiring and hardware recertification.

In various exemplary embodiments, the distributed interlock system disclosed herein evaluates interlock equations in substantially real-time via a field-programmable gate array (FPGA) or an application specific integrated circuit (ASIC), or other controller or processor type or other components known in the art, configured in a master-slave configuration (or as multiple, interconnected masters, at least some of the multiple masters having their own set of slave devices) and in as little as one cycle-time of an EtherCAT backbone. Consequently, the distributed interlock system is proactive, rather than reactive, and the system performs without adding latency to I/O execution cycles.

Therefore, the distributed interlock system disclosed herein allows for system wide, distributed interlocks that are evaluated proactively and substantially in real-time. In various embodiments, the interlock equations may be firmware configurable thereby eliminating customary hardware changes and associated safety recertifications. Consequently, the disclosed distributed interlock system enables significant development cycle-time reductions as well as cost reductions.

The disclosed subject matter contained herein relates generally to operations of "tools" in a semiconductor fabrication environment (fab). Such tools can include various types of deposition (including plasma-based tools such as ALD (atomic layer deposition), CVD (chemical vapor deposition), PECVD (plasma-enhanced CVD), etc.) and etching tools (e.g., reactive-ion etching (RIE) tools), as well as various types of thermal furnaces (e.g., such as rapid thermal annealing and oxidation), ion implantation, and a variety of other process and metrology tools found in various fabs and known to a person of ordinary skill in the art. Additionally, components of certain tools, such as gas-delivery boxes supplying various gases (including toxic and/or caustic gases) to the tools, benefit from various ones of the embodiments disclosed herein. However, the disclosed subject matter is not limited to semiconductor environments and can be used in a number of machine-tool environments such as robotic assembly, manufacturing, and machining environments.

Consequently, because of a possible threat to human safety or machine safety and operability, all tools in a fab have one or more safety features and/or requirements. For example, interlocking systems and various types of sensors are built into the tools or can be added to various tools. In one example, the person of ordinary skill in the art knows that a radio-frequency (RF) generator on a plasma-based tool should be locked-out while maintenance is performed on the RF generator. In other examples, the skilled artisan recognizes that certain types of two or more gases may combust or have another type of dangerous interaction if combined. As noted above, contemporaneous implementations of the EtherCAT standard and related technologies are not meeting all requirements for human safety and proper tool operation.

For example, the distributed interlock system can refer to lookup tables to determine if any particular combination of sequences that may be particularly detrimental to human safety or machine safety and operation, either in a single tool or tool-to-tool. In one specific example, a person of ordinary skill in the art knows that silane ($SiH_4$) is an inorganic, colorless gaseous compound of silicon and hydrogen that has strong reducing properties and is spontaneously flammable in air. Consequently, if mixed, oxygen and silane can potentially ignite or explode. By placing such chemical reactions into the lookup table, the disclosed subject matter can prevent valves that control the flows of these gases from combining the gases. Consequently, such chemical reactions can be prevented from ever occurring, rather than simply reacting to a potentially-disastrous condition that has already occurred. This "preventative-type" of interlocking operation is described in more detail below.

As disclosed herein, the disclosed subject matter is configurable to provide interlocks on all input/output (I/O) ports on tools. Also, the disclosed subject matter, as noted above, can be preventative—to stop certain interactions and operations from occurring rather than simply shutting down a tool or I/O port after an operation has already occurred. Therefore, the disclosed subject matter can interlock software signals with hardware signals.

For ease in understanding the disclosed subject matter, various examples will be provided with reference to a semiconductor fabrication environment. However, upon reading and understanding the disclosure provided herein, the person of ordinary skill in the art will recognize that the distributed interlock system of the present disclosure can be used in a wide variety of environments where various types of tool, tools, or other machines are used.

Referring now to FIG. 1A, an example of a high-level overview of a control automation technology (CAT) control system 100 with distributed interlock (ITLK) system components, according to various exemplary embodiments, is shown. FIG. 1A is shown to include a master device 101, a number of slave nodes 105A through 105C (which may comprise, for example, a tool or a portion of a tool, such as a gas-delivery box, or individual components within a tool), and an interlock master 111. FIG. 1A shows three slave nodes for illustrative purposes. However, the number of slave nodes may be smaller (e.g., as few as one) or much larger.

The master device 101 may be, in an exemplary embodiment, a single-board computer (SBC). The master device 101 may receive inputs from and provide outputs directly to one or more of the slave nodes 105A through 105C. In various embodiments, one or more of the slave nodes 105A through 105C may provide inputs to or receive outputs from a sequencer 103. The sequencer 103 is shown to comprise a portion of the master device 101 but in other embodiments, the sequencer 103 may be a standalone device (not shown). In embodiments, one or more of the slave nodes 105A through 105C may provide inputs to or receive outputs from both the master device directly and/or the sequencer 103.

In various embodiments, the sequencer 103 may be a firmware-based or a software-based component. The sequencer may be "running" on the master device or in the standalone device. In embodiments, the sequencer may be a hardware-based device implemented in, for example, one or more field-programmable gate arrays (FPGAs) or in one or more application specific integrated circuits (ASICs), or other controller or processor type components known in the art.

The sequencer 103 can be used to analyze sequences of events, for example, within a tool or across a variety of tools (e.g., in a tool-to-tool interaction). These interactions may include, for example, tracking inputs and when such inputs turn on (e.g., with reference to time or with reference to another event) as well as track when an output response occurs (e.g., with reference to time or with reference to another event).

Each of the slave nodes 105A through 105C is shown to include an interface translation card 107 and an interlock (ITLK) slave device 109. As shown in FIG. 1A, the interface translation card 107 is shown to be a Type 5 device, known in the art. However, a person of ordinary skill in the art will recognize, upon reading and understanding the disclosure provided herein, that other types of interface cards could readily be substituted as well. The ITLK slave device 109 receives an input signal, DI, and provides an actual output signal, SI. The actual output signal, SI, is an actual value of the output signal, which is a read back of an output signal, SO.

As shown, each of the slave nodes 105A through 105C are coupled to the interlock master 111. In various embodiments, the interlock master 111 may be configured in accordance with RS-485 or related standards, However, there is no requirement that the interlock master Ill run the RS-485 or related standard.

Overall, the CAT control system 100 with the distributed interlock (ITLK) system components provides for a system-wide interface with DI/DO interlocking, as described in more detail below.

Figure 1B:
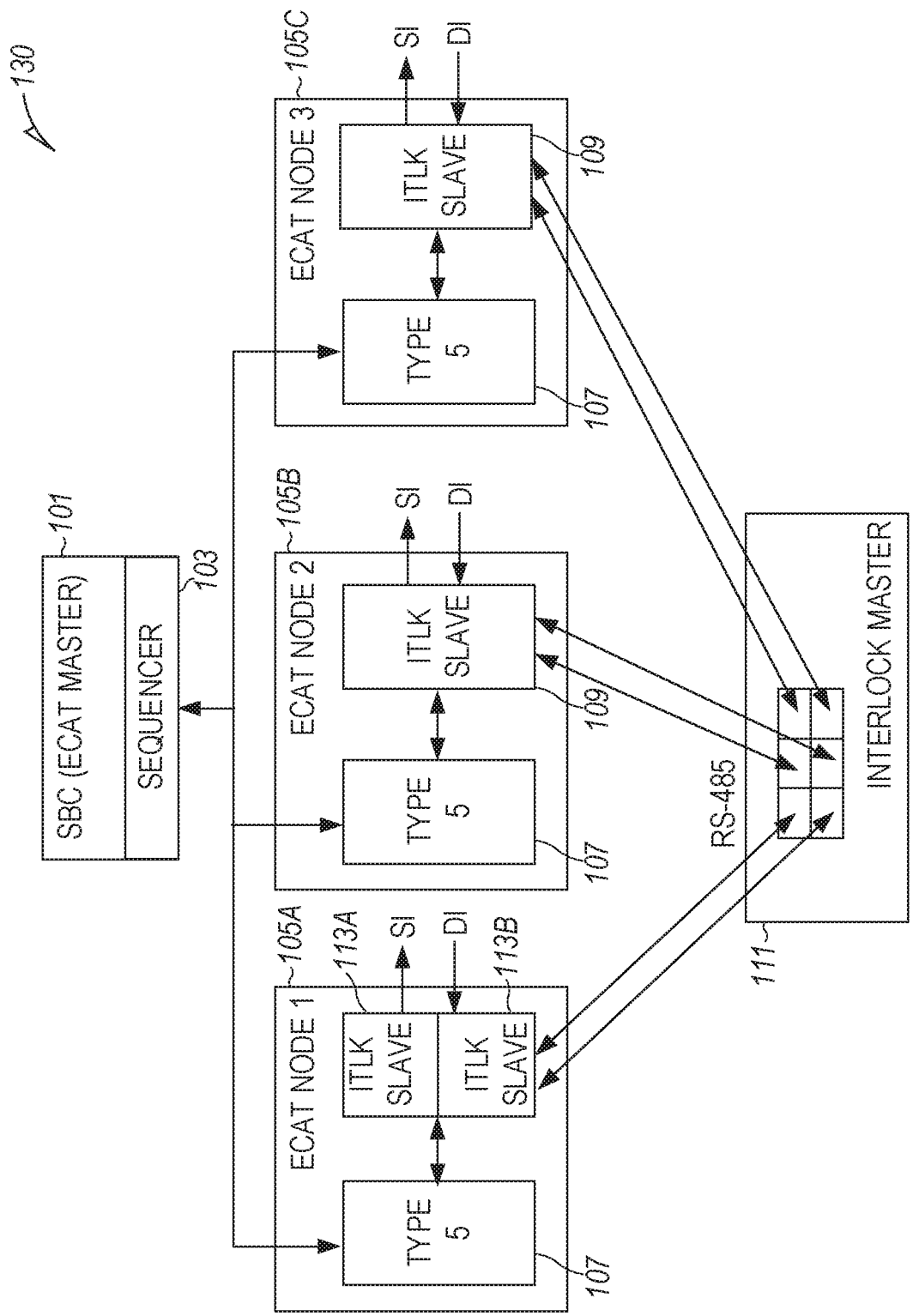
FIG. 1B shows another example of a high-level overview of a CAT control system with distributed interlock (ITLK) system components, according to various exemplary embodiments.

FIG. 1B shows another example of a high-level overview of a CAT control system 130 with distributed interlock (ITLK) system components, according to various exemplary embodiments. In this embodiment, the sequencer is arranged to intercept all incoming signals from the slave nodes 105A through 105C and all outgoing signals to the slave nodes 105A through 105C. Further, FIG. 1B shows two ITLK slave devices within the slave node 105A. An output ITLK slave device 113A and an input ITLK slave device 1133B.

As shown in FIG. 1B, the output ITLK slave device 113A provides an actual output signal, SI. As noted above with reference to the ITLK slave device 109, the actual output signal, SI, is an actual value of the output signal, which is a read back of an output signal, SO. Also, as shown, the ITLK slave device 113B receives an input signal, DI.

In various embodiments, the systems of FIGS. 1A and 1B provide for an interlock master module for centralized interlock calculations and an interlock equation solver. All interlock equations may be contained in, for example, the master device 101, the interlock master 111, or a combination of the two although the disclosure is not so limited to only these devices. In an embodiment, each of the ITLK slave devices 109, 113A, 113B is a remote I/O device. In a specific exemplary embodiment, the ITLK slave devices 109, 113A, 113B can manage 64 DI and 64 DO or more per device, can be daisy-chained with one or more other ones of the ITLK slave devices 109, 113A, 113B, each having an expandable I/O, and can comprise the same hardware and firmware for ready interchangeability, and can sustain 500 mA or more current per output.

Various combinations of the CAT control system 100 with distributed interlock (ITLK) system components of FIG. 1A and the CAT control system 130 of FIG. 1B may be used. The high-level overviews merely provide an overview of two possible system architectures. More details for the CAT control systems are described below.

Figure 2:
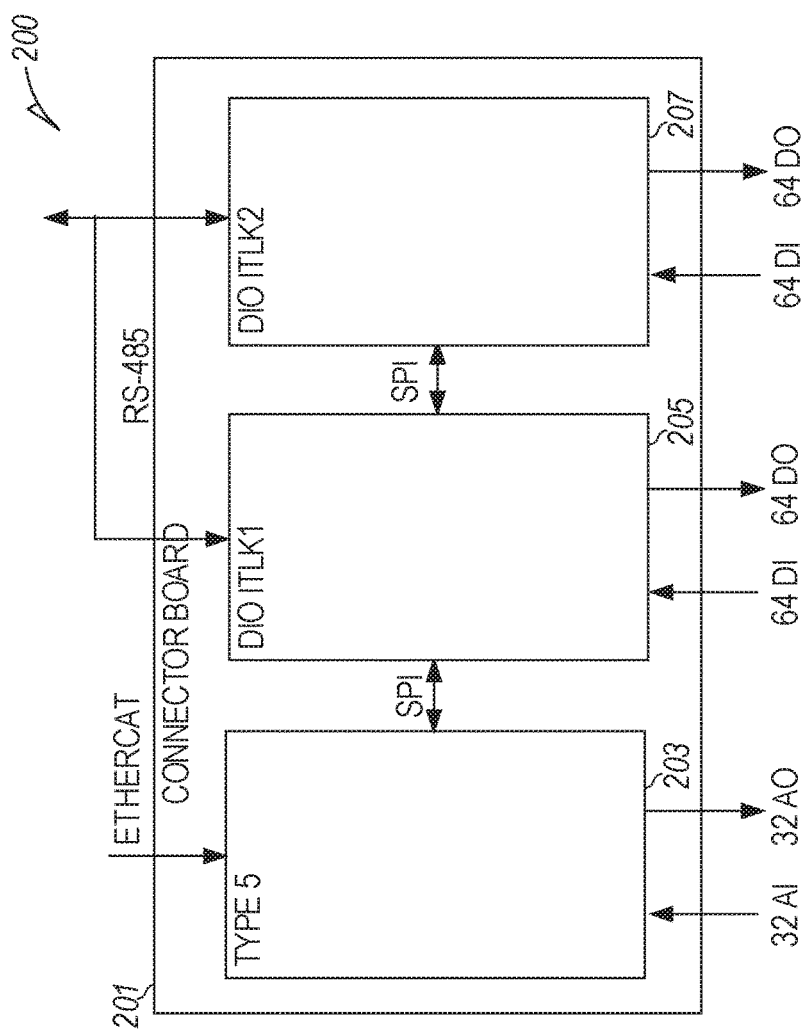
FIG. 2 shows an example of a node package overview according to various exemplary embodiments.

FIG. 2 shows an example of a node package overview 200 (e.g., a node module) according to various exemplary embodiments. FIG. 2 is shown to include a connector board 201 with an interface translation card 203, a first DIO ITLK board 205, and a second DIO ITLK board 207. The interface translation card 203 may be the same as or similar to the ITLK slave devices 105 through 105C of FIGS. 1A and 1B. Each of the first DIO ITLK board 205 and the second DIO ITLK board 207 may be similar to the IT LK slave device 109 of FIGS. 1A and 1B.

As shown in a specific exemplary embodiment depicted by FIG. 2, the interface translation card 203 may be a Type 5 device, known in the art. However, a person of ordinary skill in the art will recognize, upon reading and understanding the disclosure provided herein, that other types of interface cards could readily be substituted as well. The interface translation card 203 is coupled to the first DIO ITLK board 205, which is, in turn, coupled to the second DIO ITLK board 207 by, for example, a serial-peripheral interface (SPI) communication channels. In this embodiment, the interface translation card 203 is also coupled to an EtherCAT connection and is shown to receive as many as 32 analog inputs (AI) and transmit up to 32 analog outputs (AO). However, the number of AI and AO channels is shown to be illustrative only and is not limited to 32 AIs and 32 AOs.

As shown in the specific exemplary embodiment depicted by FIG. 2, each of the first DIO ITLK board 205 and the second DIO ITLK board 207 may have up to 64 digital inputs (DI) and 64 digital outputs (DO) per board, which are further expandable by daisy-chaining. However, the number of DI and DO channels is shown to be illustrative only and is not limited to 64 DIs and 64 DOs.

Also, as shown, each of the first DIO ITLK board 205 and the second DIO) ITLK board 207 are coupled by, for example, an RS-485 interface to, for example, the interlock master of FIG. 1A or 1B. Although not shown explicitly, additional DIO ITLK boards may also be incorporated. Each of the first DIO ITLK board and the second DIO ITLK board 207 can sustain 500 mA or more current per output. In a specific exemplary embodiment, each of the first DIO ITLK board 205 and the second DIO ITLK board 207 can sustain a 7 A or larger load and may be configured to be input protected and output protected against a short-to-ground, and further protected to −15 V and to +24 V. These voltage and current ratings are illustrative only and are not limited to the values shown.

Based on the description provided herein, and as described in more detail below, the distributed interlock system of the disclosed subject matter provides at least the following interaction and safety features:

(1) Preventative System interlocking that is:
  Not limited by DI/DO local to the node; and
  Capable of interlocking the intent to drive outputs;
(2) Flexibility—any DO in the system can be interlocked with any DI or DO;
(3) Configurability—interlock equations can be changed easily and readily;
(4) Predictability—the system has a deterministic interlock response time;
(5) Safety—the system has a safety integrity level of 3 (SIL3 compliant) as defined by the IEC 61508 standard and is a dual redundant system: and
(6) Visibility—the system can be integrated readily with, for example, graphical user interfaces (GUIs) having diagnostic utilities for start-up operations and troubleshooting. Representative GUIs are described in more detail below.

In a specific exemplary embodiment, a GUI may display various items such as an operational status of each node in the system; a DI and DO status for each component in the system; expected interlocked outputs versus actual interlocked outputs; and an AI and AO status for various components in the system. The exemplary GUI can be used to toggle DOs and set AOs; plot and analyze, for example, AIO, DIO, and SIO waveforms; and upload and download all or selected portions of object statuses on the EtherCAT.

The exemplary GUI may also provide an "EtherCAT view," showing, for example, SIO and SIO user interfaces. The EtherCAT view can be configured to provide, for example, diagnostics and troubleshooting during a startup event ("bring up") or in the event of errors. The EtherCAT view can also be configured to report the status of every DIO and SIO in the system, DOs can be commanded "on" or "off," and an SO SI mismatch can be highlighted and/or color coded to indicate which type of mismatch occurred.

Additionally, the EtherCAT view can be configured to provide a plotting tool that can track, plot, and save waveforms of any signal in the system. Such a plotting tool is useful for analyzing sequences to, for example, track inputs and when the inputs turn on and track when related output responses occur. Each of the various types of GUI and the EtherCAT view use tools known to and understood by a person of ordinary skill in the art.

The distributed interlock system of the disclosed subject matter further provides particular features and functionality, as described above and in more detail below, including at least the following in certain specific exemplary embodiments:

(1) A dual redundant system that can utilize pre-certified hardware;
(2) A serial communication system such as RS-485 between master (or masters) and one or more slaves in a communications protocol;
(3) A preventative interlocking that is also capable of an interlocking intent, to drive an output;
(4) A deterministic interlock latency of less than, for example, 1 millisecond (msec), which is independent of a number of interlock equations;
(5) A synchronous input sampling and output driving; and
(6) A capacity for up to 5000 of more interlock instructions.

Figure 3:
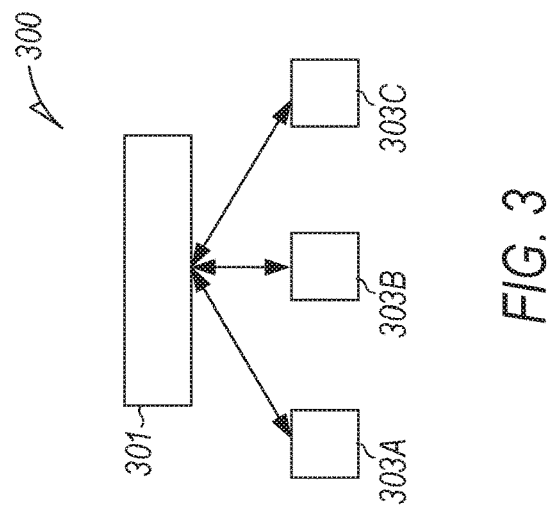
FIG. 3 shows an example high-level overview of the distributed interlock system according to various exemplary embodiments.

With reference now to FIG. 3, an example high-level overview of the distributed interlock system 300 is shown, according to various exemplary embodiments. The high-level overview of the distributed interlock system 300 is merely an illustrative example to provide a generalized theory of operation and is shown to include a motherboard 301 and a number of daughterboards 303A through 303C, arranged in a master/slave architecture. Although only three daughterboards are shown, the distributed interlock system 300 is not limited to three. More or fewer daughterboards may be used.

A master, here the motherboard 301, includes a centralized interlock equation solver. All interlock equations may be stored on, for example, a non-volatile memory device (e.g., a flash memory device) within the motherboard 301. The motherboard 301 may be the same as or similar to the master device 101 of FIGS. 1A and 1B.

Each of the slave devices, here the daughterboards 303A through 303C, may be similar or identical to one another. Also, each of the daughterboards 303A through 303C, may be the same as or similar to the ITLK slave devices 109 of FIGS. 1A and 1B. In embodiments, individual ones of the daughterboards 303A through 303C may be identified by a unique identification (ID) provided by, for example, the connector board, in order to uniquely address a specific one of the daughterboards 303A through 303C. Each of the daughterboards 303A through 303C, as slave devices, may synchronously sample received inputs and send the received inputs to the motherboard 301, as the master device. Further, each of the daughterboards 303A through 303C may synchronously drive outputs based on results or directions received from the motherboard 301.

Figure 4A:
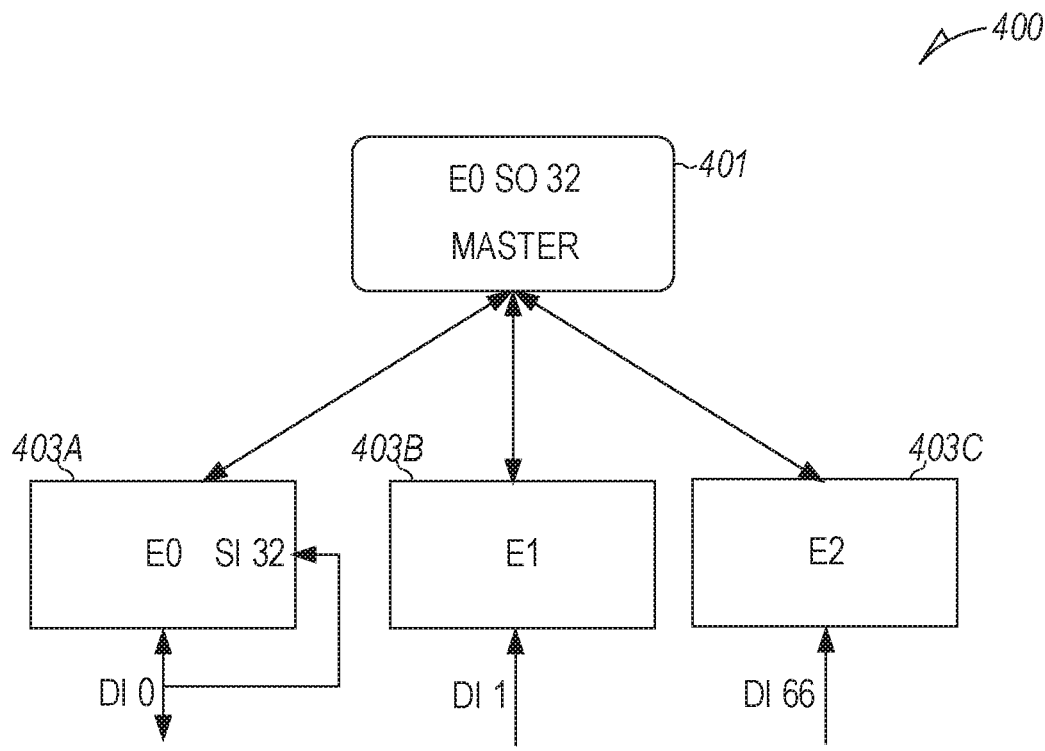
FIG. 4A shows an example of system interlocking according to various exemplary embodiments.

FIG. 4A shows an example of system interlocking 400 according to various exemplary embodiments. FIG. 4A is shown to include a master device 401 and a number of slave devices 403A through 403C. Each of the master device 401 and the slave devices 403A through 403C may be the same as or similar to other master and slave devices identified herein, such as the master device 101 and the ITLK slave nodes 105A through 105C of FIGS. 1A and 1B. Within the example of system interlocking 400, any DO in the system can be interlocked by any combination of DO and DI.

For example, with continuing reference to FIG. 4A, a logic example (E0 SO 32=(E0 DI 0) & (E1 DI 14) & (E2 DI 66)) is provided from the master device 401 sending and receiving signals from the three slave devices 403A through 403C (also shown in FIG. 4A as E0, E1, and E2). In various embodiments, the three slave devices 403A through 403C are all linked (e.g., by one or more field-connect boards on each tool) and controlled by the distributed interlock system disclosed herein.

Figure 4B:
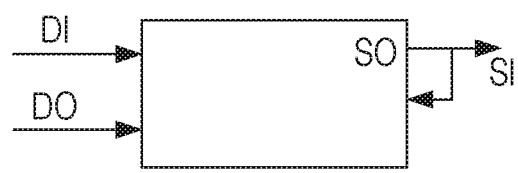
FIG. 4B shows an example of system interlocking with reference to a feedback of an actual value of an output in comparison with an expected value of the output according to various exemplary embodiments.

FIG. 4B shows an example of system interlocking 430 with reference to a feedback of an actual value of an output in comparison with an expected value of the output according to various exemplary embodiments. In FIG. 4B, an intended digital output from the master is transmitted to a board on a tool to drive a certain operation (e.g., the DO is an input to the tool). A safety out (an expected value at the output) is monitored and fed back as the actual value of the output (that is, is a read back of SO). If the two values are not the same or within some pre-determined tolerance level of, for example, a given operation or tool, the distributed interlock system disclosed herein can revert to a safety mode as needed for a given operation and/or tool. The distributed interlock system can consider and act on multiple inputs (e.g., several thousand or more) such as DO signals from other software and/or hardware to be certain all software and hardware provide safe operations.

Figure 4C:
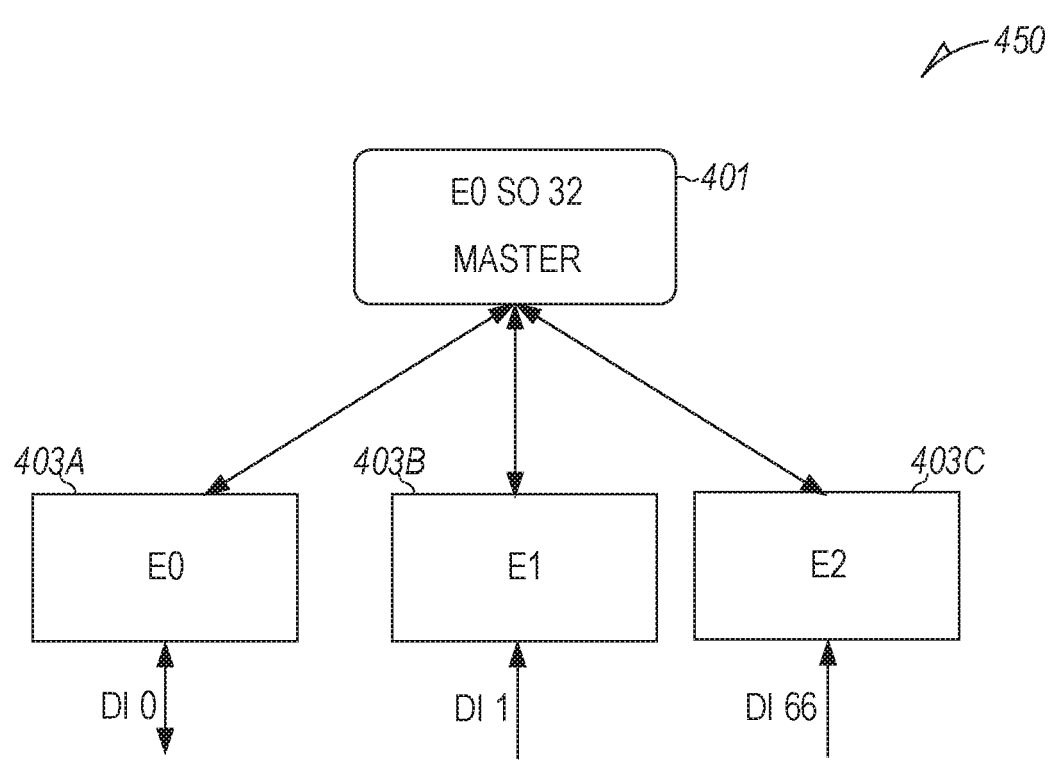
FIG. 4C shows an additional example of system interlocking according to various exemplary embodiments.

FIG. 4C shows an additional example of system interlocking 450 according to various exemplary embodiments. FIG. 4C is shown to include the master device 401 and the three slave devices 403A through 403B. In this logic example, (E0 SO 32=(E0 DI 0) & (E1 DI 14) & (E2 DI 66)) is provided from the master device 401 sending and receiving signals from the three slave devices 403A through 403C. In another logic example, E1 SO 44=(E0 SO 32) as is understood by a person of ordinary skill in the art.

Figure 5:
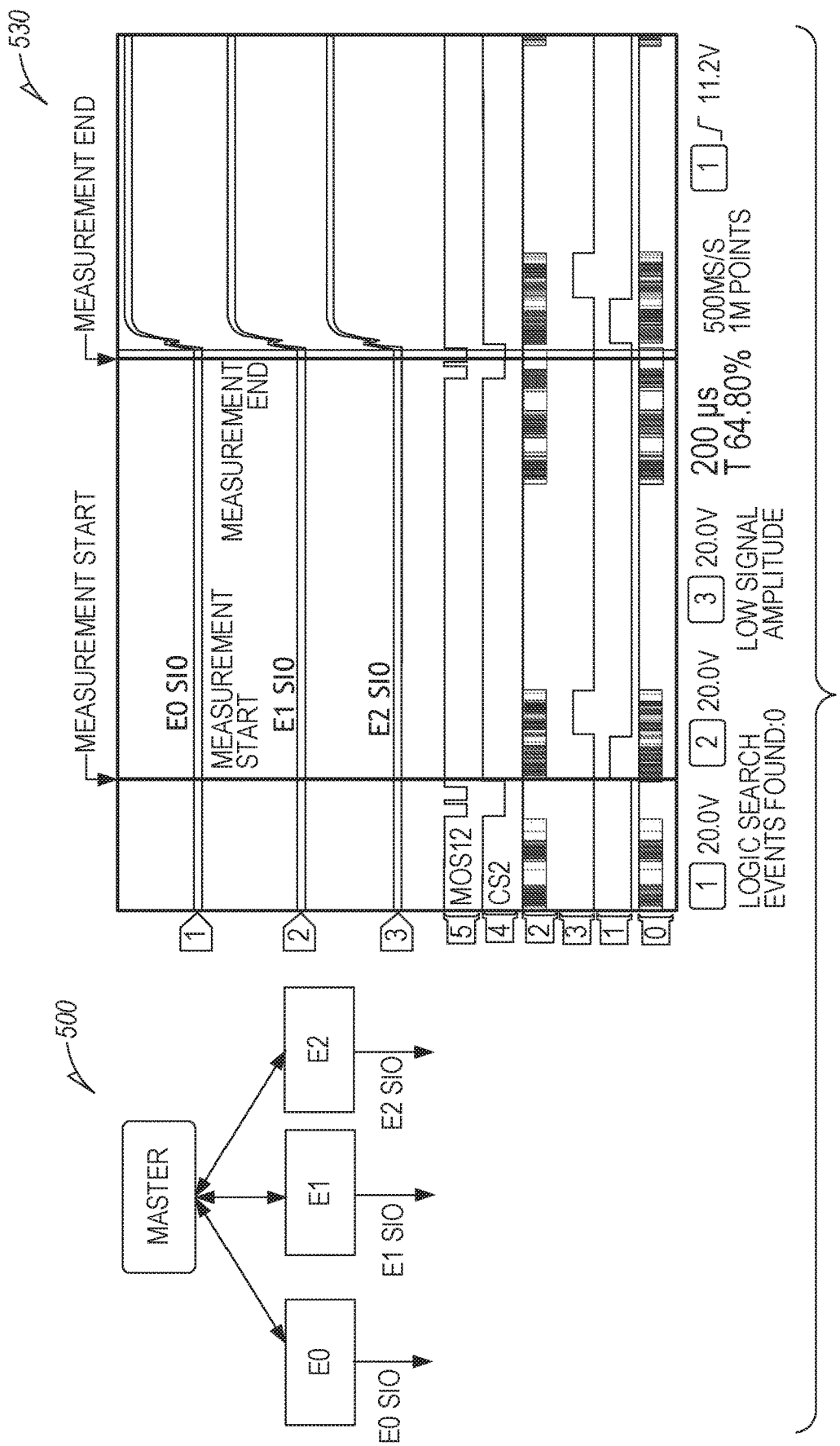
FIG. 5 shows an example of deterministic latency and synchronous inputs and outputs according to various exemplary embodiments.

FIG. 5 shows an example of deterministic latency and synchronous inputs and outputs according to various exemplary embodiments for a master-slave architecture 500, and an associated graph showing measurement start points and endpoints for SIOP of each of E0, E1, and E2. A deterministic response time may be, in a specific exemplary embodiment, updated every 1 millisecond (msec) or less, regardless of the number of interlock equations and/or commands and/or operations involved. Therefore, in this embodiment, the response time (e.g., the time something is needed to the time something is acted upon) is less than 1 msec. In the case of a semiconductor fab, a synchronous output can drive all nodes either in fab and/or within a sub-fabrication (or process line) for commands issued at the same time. A synchronous output driving all nodes (e.g., box-to-box) may have a maximum output-to-output jitter of, for example, approximately 100 nanoseconds (nsec).

Figure 6B:
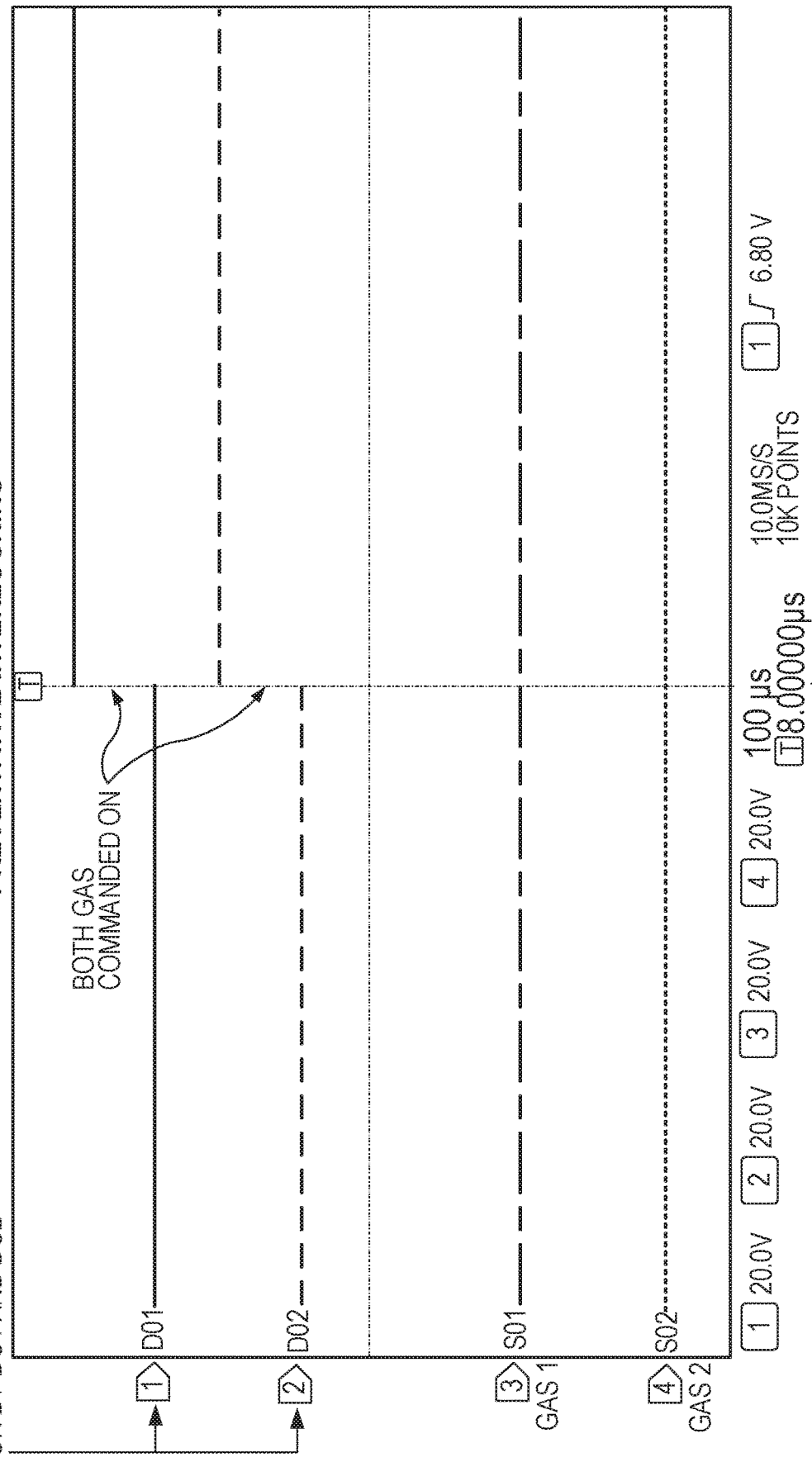
FIG. 6B shows an example of preventative interlocking according to various exemplary embodiments.

FIG. 6A shows an example of inhibitive interlocking and FIG. 6B shows an example of preventative interlocking, each according to various exemplary embodiments. As described herein, the disclosed distributed interlock system has both inhibitive interlocking and preventative interlocking, whereas systems of the prior art have no preventative interlocking. For example, as noted in FIG. 6A, the inhibitive system allowed two gas valves to turn on approximately simultaneously for 520 microseconds (μsec) before turning them off. Whereas, the preventative system of FIG. 6B, as part of the distributed interlock system disclosed herein, prevented either gas valve from opening even though both valves were commanded by DO1 and DO2, respectively, to be turned on. The preventative interlocking portion of the distributed interlock system can incorporate, for example, various types of lookup tables, as described above, to prevent the valves from opening even though command turn-on signals were sent.

Therefore, as shown in FIGS. 6A and 6B, the interlock system has a capability to interlock an intent of driving an output, where the output is based on a status of inputs and an intent of the driving output. The system therefore prevents the system from ever driving outputs that cannot be on at the same time due to equipment safety and/or human safety concerns (e.g., such as the example given above of combining oxygen and silane, which can potentially ignite or explode).

Continuing with the example of FIG. 6A, assume D01 and D02 are intended input signals. Further assume that S01 and S02 are output signals after a relay interlock. When both the D01 and D02 signals are simultaneously set to "1," the interlocked outputs signal S01 and S02 show a glitch of 520 μsec due to the relays time of the relays being turned off.

Figure 7:
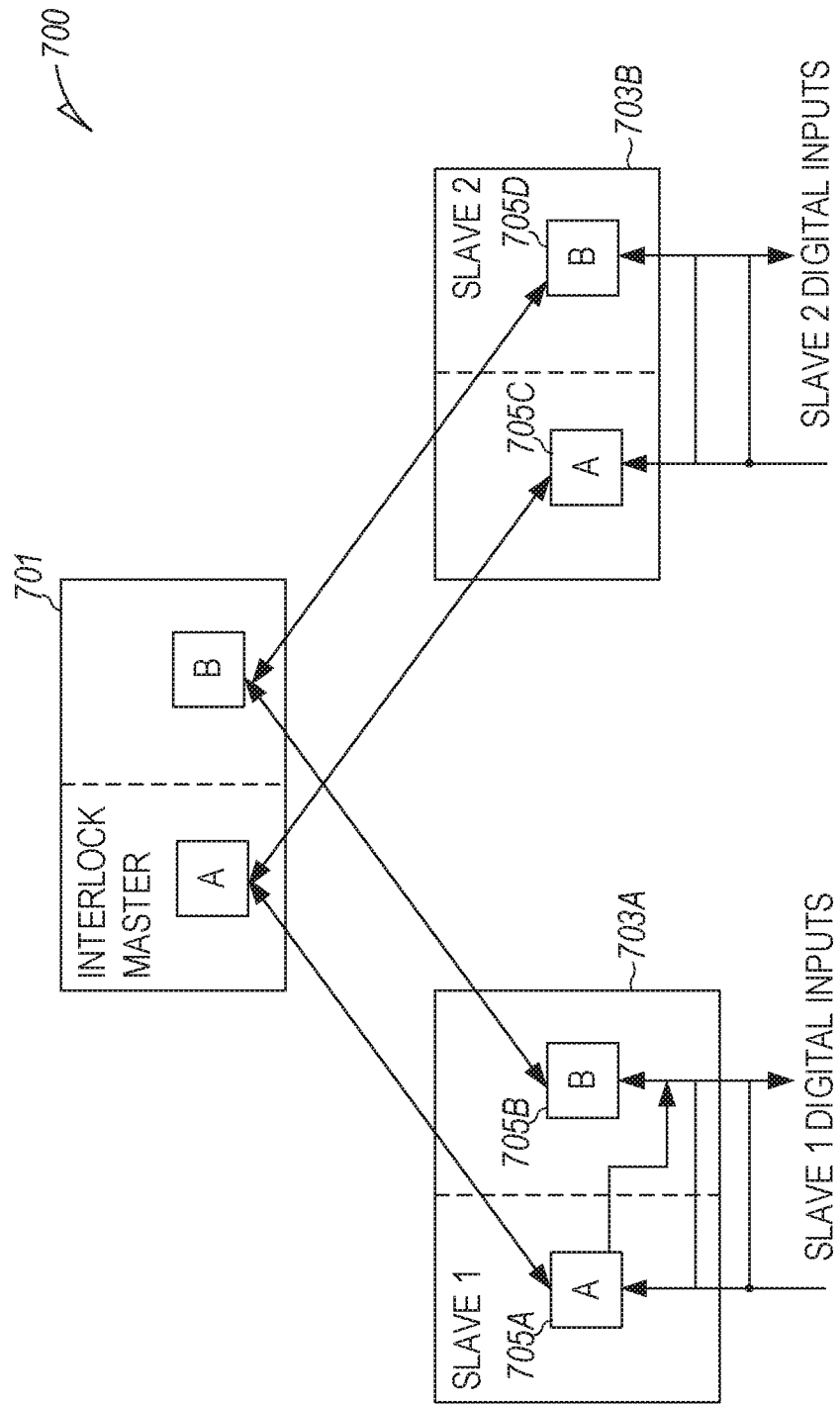
FIG. 7 shows an example of dual redundancy of the distributed interlock system according to various exemplary embodiments.

FIG. 7 shows an example of dual redundancy 700 of the distributed interlock system according to various exemplary embodiments. The distributed interlock system can be configured to have at least a dual redundancy with, for example, two FPGAs on each board (on both the master and all slaves) to perform the same tasks. The FPGAs are illustrative only and can be substituted or supplemented by one or more other devices discussed herein, such as one or more ASICs.

As shown in FIG. 7, an interlock master 701 has a first redundancy module, A; and a second redundancy module, B. A first ITLK slave device 703A and a second ITLK slave device 703B are each shown to include a first redundancy module, A; and a second redundancy module, B (element numbers 705A, 705B, 705C, and 705D, respectively). As noted above, each of the modules may comprise a variety of hardware devices (e.g., an FPGA, an ASIC, a processor, etc.), firmware devices (e.g., electronic devices programmable to execute certain codes), or software-based devices that control certain physical device and related input signals and output signals. Programmability considerations are discussed in more detail below.

In one embodiment, each of the redundant devices on each board may be programmed to perform the same tasks. For example, if the first redundancy module, A fails, the second redundancy module, B automatically takes over the tasks of the first redundancy module.

In another embodiment, the first redundancy module A drives output signals and output devices. The other redundancy module reads back the output signals, compares them with its own results, and shuts off the output signals if there is a mismatch within a pre-determined limit. In some examples, the pre-determined limit may be 0.

In this embodiment, all governing and controlling equations (plus any lookup tables) may be kept on the interlock master 701. In this example the first ITLK slave device 703A (portion "A") performs actual "driving operations," such as switching a valve, while the second ITLK slave device 703B (portion "B") performs a readback of signals and highlights any differences (within a predetermined limit) to potentially place the slave and associated tool back into a safe state as noted above. Therefore, the distributed interlock system incorporates, in this embodiment, "communications" between "A" and "B" to verify commands and other I/O signals.

With regard to, for example, programmability of FPGAs, some considerations in a specific exemplary embodiment include:
(1) A separation of interlock equations from FPGA firmware (FW)
  a. FPGA FW
    i. The FPGA FW may be configured to operate various functions of the system; and
    ii. The FPGA FW may be pre-certified and does not necessarily need to change when equations are changed. Therefore, no re-certification is needed.
  b. Interlock Equations:
    i. Interlock equations are specific to a use case of the system;
    ii. The interlock equations can change without having to redo FPGA FW certification; and
    iii. Tool safety re-certification is still used.
(2) Programmability can be designed for IEC 61508 certification.

Figure 8:
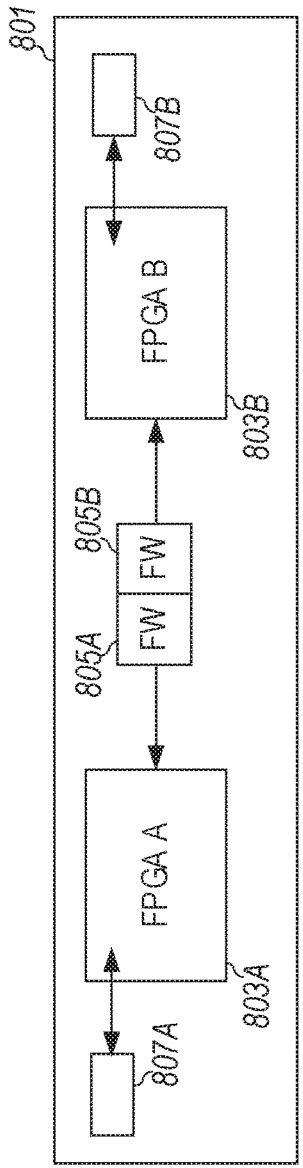
FIG. 8 shows an example of a separation of firmware and interlock equations of the distributed interlock system according to various exemplary embodiments.

FIG. 8 shows an example of a separation of firmware and interlock equations of the distributed interlock system according to various exemplary embodiments. FIG. 8 is shown to include an interlock master unit 801. The interlock master unit 801 may be the same as or similar to others of the master devices described herein. The interlock master unit 801 includes a first FPGA 803A and a second FPGA 803B. Each of the first FPGA 803A and the second FPGA 803B is coupled, respectively, to a non-volatile memory device 807A, 807B and firmware devices 805A, 805B.

The non-volatile memory device 807A, 807B may be any of the non-volatile memory devices described herein and known in the art such as, for example, flash memory devices, conductive-bridging random-access memory (CBRAM), programmable metallization cell (PMC), phase-change memory (PCM), and other non-volatile memory types known in the art. Devices configured to by programmed as firmware devices are known in the art (e.g., a device-configuration semiconductor chip or integrated circuit configured to receive firmware and firmware updates).

In a specific exemplary embodiment, the FW component is stored on the firmware devices 805A, 805B and may be programmed via its own header. The firmware devices 805A, 805B may comprise a single firmware device with two files or two separate firmware devices, each with a file for the respective FPGA 803A, 803B. The FW files on each of the firmware devices 805A, 805B may be identical, but are stored in different addresses. The interlock equations are stored in the non-volatile memory devices 807A, 807B. An interface, such as an SPI communications channel, may couple the non-volatile memory devices 807A, 807B to the respective FPGA 803A, 803B. Regardless of the specific configuration, contents of the non-volatile memory devices 807A, 807B do not affect functional FW stored in the respective firmware devices 805A, 805B.

In one example of the separation of firmware and interlock equations as shown in FIG. 8, an application-specific code (e.g., a multi-use code) of controlled or controllable tools (e.g., semiconductor process tools such as ALD, CVD, PECVD, PVD, etc. or components located thereon or therein) can be changed by an end user. Therefore, this changeability is a programmable aspect. Functional code however, (e.g., A driving and B reading back as described above) may not generally be configurable by an end user so as to prevent unintended results; the unintended results could potentially eliminate some or all safety functions of the distributed interlock system as described herein.

Figure 9:
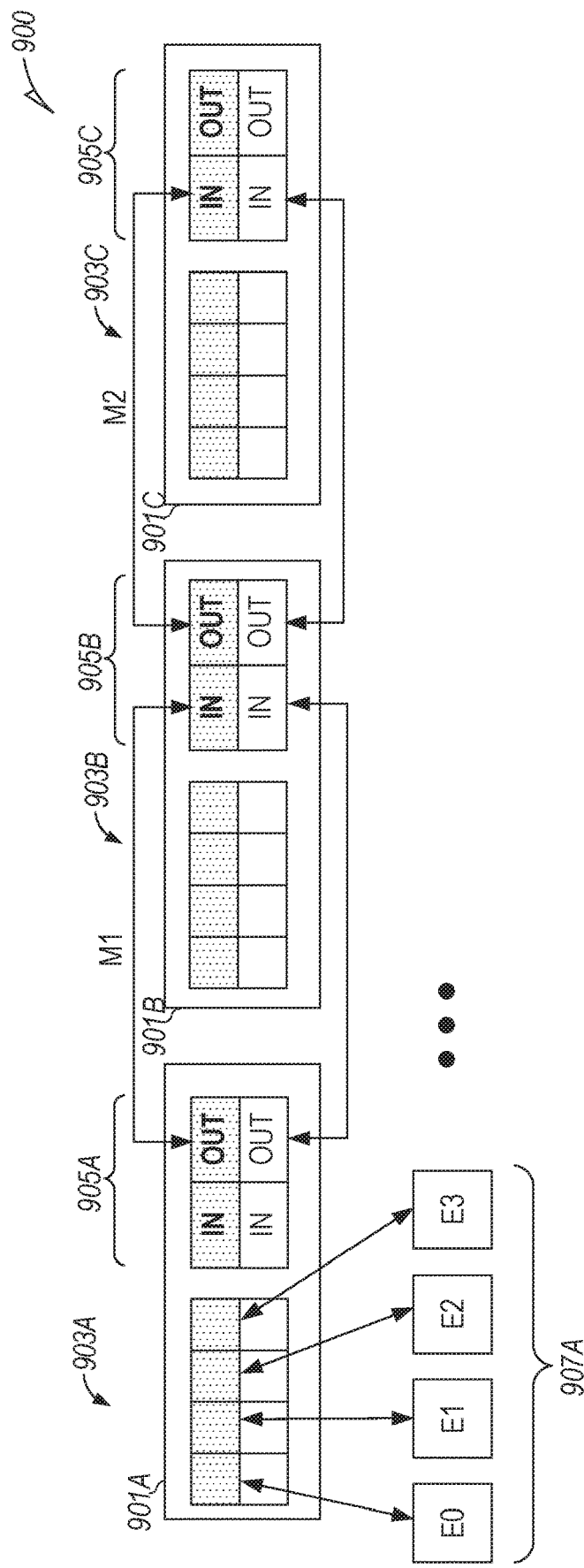
FIG. 9 shows an example of a system architecture for daisy-chaining communications between multiple master devices according to various exemplary embodiments.

FIG. 9 shows an example of a system architecture 900 for daisy-chaining communications between multiple master devices according to various exemplary embodiments. The system architecture 900 is usable with any of the other systems described herein.

FIG. 9 is shown to include a number of master devices 903A, 903B, 903C (the master devices are also labeled on the drawing as M0, M1, and M2). Three master devices are shown for illustrative purposes but more or fewer master devices may be used. Each of the master devices 903A, 903B, 903C includes a master-to-slave communications portion 901A, 901B, 901C, respectively, and a master-to-master communications portion 905A, 905B, 905C, respectively. Each of the communications portions may be based on an RS-485 communications protocol or other wired or wireless protocols and techniques known in the art. For example, ethernet communications may be used between the master devices. In a specific exemplary embodiment, the master devices may be in communication at 100 Mbps (or higher), full duplex, in a line topology. Additionally, there may be an intervening network device or network configuration located between one or more of the master devices 903A, 903B, 903C. As with any of the master devices or systems described herein, the system can be configured to calculate for any of the ITLK devices along with potential delays, such as delays due to process tolerances or noisy and/or bouncing signals. Such delays can avoid false trips or false alarms in the system.

For illustrative purposes, the master device 903A is shown to be in electrical communication with a plurality of slave devices 907A (the slave devices are also labeled on the drawing as E0, E1, E2, and E3). Each of the slave devices 903A may be ITLK slaves located on, for example, a single tool or may be slaves physically distributed over a number of tools including all tools located in one or more process lines. Four slave devices are shown for illustrative purposes but more or fewer slave devices may be used. Further each of the master devices 903A, 903B, 903C may be coupled to a plurality of slave devices (not shown) so as not to obscure the disclosed subject matter.

For shared IO operations between various ones of the master devices 903A, 903B, 903C, in exemplary embodiments:
(1) Any DI, DO on any node can be shared with any master device (e.g., any DIO on any master device can be interlocked with any other DIO on any other master device);
(2) Shared IO (XIO) transmission of over 1 Gbps ethernet on various types of communications can occur, such as over reduced media-independent interface (RMII), gigabit media-independent interface (GMII), reduced gigabit media-independent interface (RGMII), serial gigabit media-independent interface (SGMII), quad serial gigabit media-independent interface (QSGMII), 10-gigabit media-independent interface (XGMII), and others; all at full duplex;
(3) Firmware may have a shared reflective memory space on each master device;
   a. Each master device has allocated memory space for XIO;
   b. XIO memory data are updated every interlock calculation cycle; and
   c. After all master data exchanges are completed, all XIO memory can contain the same content;
(4) Each master "knows" where it stands in the chain and can read the link status of a physical layer (PHY);
(5) Each master device can have a unique ITLK table that, for example, describes which and how many slave devices will be coupled to a master device and describes SO logic that is local to each master (e.g., can use DIO from any slave); and
(6) Each master device knows when to add or drop based on an ITLK table—there is no set connection order.

In various exemplary embodiments, a detailed reflective memory transfer may include:
(1) A reflective memory update that initiates once per interlock calculation cycle;
(2) The update may be initiated by, for example, a first master device and a final master device in a chain after receiving the latest slave data; and
(3) Data are forwarded down the chain until all data have been received.

As is with the other system embodiments described herein, each interlock master can runs functional firmware (or hardware equivalents thereof). Each interlock master also runs application firmware (interlock logic firmware). Functional firmware refers to code that runs the system, such as, for example, serial communications, system watchdog, and other functions. Application firmware refers to the interlock logic that is programmed into the unit that was written by the end user. Examples of the firmware are also described herein in other portions of this disclosure.

In embodiments, the application firmware may be generated automatically from a software parser. The software parser translates a human-readable interlock logic table (e.g., from a spreadsheet) into multiple hexadecimal files: one hexadecimal file for each master that is used in the system as declared in the spreadsheet. These generated files are unique from each other and assign a medium-access control (MAC) address to the master device on which it is programmed. The generated files also declare which other MACs are in the system.

With this MAC, each master device knows exactly the other master devices from which it should accept information. In a specific exemplary embodiment, any communications with master devices not declared in the interlock table may be treated as unsafe. Consequently, if master device "A" detects that it is connected to master device "B," which is not allowed on the system, master device "A" treats inputs from master device "B" as being unsafe. This type of arrangement can also apply to connecting two identical master devices together.

In various embodiments, any conflict caused between master devises may be treated as an unsafe condition, and all communications between those master devices may also subsequently treated as being unsafe. Master devices then may respond by discarding unsafe data to always ensure that the system fails safe.

Interlock System for Use with Gas-Delivery Boxes

In this exemplary embodiment, a component of an interlock system is described that is usable with various types of gas-delivery boxes. Gas-delivery boxes (or gas panels) are used in semiconductor manufacturing equipment to deliver multiple gases to, for example, a vacuum processing chamber to deposit or etch films on substrates. These gas-delivery boxes include multiple gas mass flow controllers (MFCs), one or more for each gas type. An MFC, and associated components to the MFC such as valves, regulators, filters, and similar types of gas-delivery components, is frequently mounted on and coupled together on a "gas stick." Typically, many gas sticks (e.g., three to thirty or more) are used to provide gases to, for example, the processing chamber of a semiconductor processing tool. Different gases, flows, and pressures may be used for each run on a process tool.

Since most, if not all, gas-delivery boxes deliver gases that are hazardous or toxic, the interlock system for use with gas-delivery boxes must prevent or minimize possible threats to human safety or machine safety and operability. In various embodiments, the interlock system may interface with various types of safety systems, such as the EtherCAT controller discussed above.

In contemporaneous systems currently employed in the semiconductor and related industries, the state-of-the-art is a gas-delivery box with multiple analog-wire connections on multi-pin connectors such as one or more "D-style" connectors. The D-style connector has many cables running to a central input/output controller (IOC) to send and receive for example, analog signals to and from gas components such as MFC devices, as well as provide power to the MFC. In addition, additional analog signals are sent to and received from additional gas-flow components such as pressure transducers and switches, digital-control signals sent to and received from pneumatic solenoids, and IOC signals to communicate with a system controller. Power is presently also provided for these and other components through the D-style connectors.

As discussed above, interlocks are required to ensure that combinations of valve openings that could cause hazardous conditions, to either the machine and/or human safety, are minimized or prevented. Such interlocks are typically hardware based, using, for example, jumper wires or a specially designed interlock printed circuit-board assembly.

In one example, vacuum-based semiconductor-manufacturing equipment uses multiple gases delivered to the process chamber to apply or remove films to and/or from substrates. Gas flows are controlled by MFCs. Solenoid-based, air-operated valves are used to open or close various gas paths to the chamber to control the gas mixture inside the process chamber. The disclosed subject matter disclosed in this section is a gas-delivery box, or gas-delivery panel, having an integral controller that communicates to a system controller via, for example, an EtherCAT interface.

For interlocking, the gas-delivery box integral EtherCAT controller can be a slave to an interlock master, which must be connected for the gas box to operate. The interlock master may perform interlock functions when connected to a module or system, or to a 1:1 test-interlock master.

A test-interlock master allows for testing a gas-delivery box. When a gas-delivery box is first built, it must be tested. A 1:1 test-interlock master always triggers the SO corresponding to the DO without any interlocks. For example, on the tool valve "A" might be silane and valve "B" might be $O_2$. The interlock master on the tool would prevent "A" and "B" from opening simultaneously. Consequently, the test-interlock master allows for verification of all functionality of the gas-delivery box. To verify functionality, using the test-interlock master allows cycling each valve to ensure operation of each of the valves. The slave needs the master input to run so, for test purposes, the 1:1 test-interlock master allows freedom to operate any valve at any time since there is no safety issue during a testing phase. Therefore, any or all combinations of valve actuations can be tested and verified.

The gas-delivery box or gas panel can be controlled via a single EtherCAT interface. The single EtherCAT interface greatly simplifies setup and test of the gas-delivery box. In various embodiments, the gas-delivery box can be configured and tested via one EtherCAT connection, thereby reducing the test equipment required and the problematic cabling and separate interface box or boxes of the prior art. The disclosed subject matter therefore allows easy integration into any gas-delivery box, such as is commonly coupled to a semiconductor processing tool, and can be pre-configured and tested so that the disclosed subject matter is "plug and play." The plug-and-play configuration allows simple integration at the site of an end user, thereby enhancing merge-in-transit (MIT) processes. As is known in the art, MIT is a process whereby individual subsystems are shipped separately to the site of an end user, and then integrated to form a complete system at the end user's site. The disclosed subject matter further enhances integration-to-order (ITO) processes.

As described in detail herein, the EtherCAT (or similar) controller is a part of the "hard structure" (the various gas-flow components such as MFCs, valves, etc. of the gas-delivery box) means that, once the gas flow paths and gas-flow components are configured, the EtherCAT controller can be configured quickly and the entire gas-delivery box may be tested through the EtherCAT interface. The EtherCAT controllers, along with the other gas-delivery box components, can be stocked at an integration site beforehand without the need of knowing what gas-delivery box will be required to be integrated. Having gas-delivery box arranged at as described at an integration site beforehand can cut the lead time of a gas-delivery box down from, for example, approximately 8 to 10 weeks to about 1 to 2 weeks. The greatly-reduced lead time commensurately saves costs while providing a fast solution to the end users of semiconductor-manufacturing and related equipment.

Figure 10:
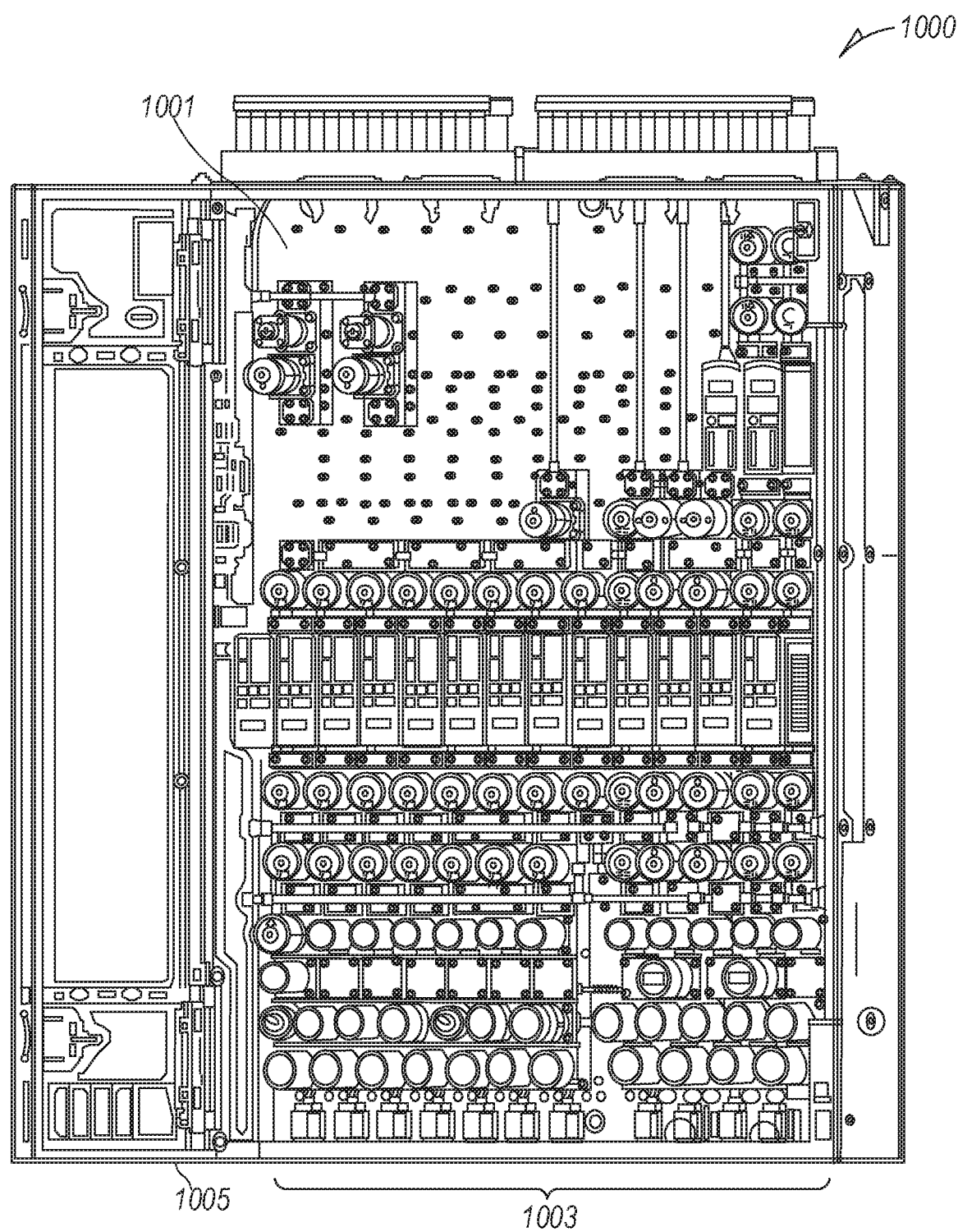
FIG. 10 shows a three-dimensional view of an exemplary embodiment of a gas-delivery box, having a number of gas-delivery channels mounted therein, using various embodiments of the disclosed subject matter.

With reference now to FIG. 10, a three-dimensional view 1000 of an exemplary embodiment of a gas-delivery box 1005, having a number of gas-delivery channels mounted therein, and using various embodiments of the disclosed subject matter is shown. The gas-delivery box 1005 can be configured to accommodate a number of gas-delivery channels to supply gases to, for example, one or more equipment gas-inlet supply lines of various types of plasma-based etching and deposition equipment as are used in the semiconductor and allied industries. For example, in various embodiments the gas-delivery box 1005 can be configured with less than 10 channels, from 10 to 20 channels, or more than 20 channels, where each channel can be coupled to various gas supplies such as various precursor gases. The gas-delivery box 1005 includes a back-plane 1001 to which various components of the disclosed subject matter can be affixed (e.g., screwed or otherwise physically or chemically attached or adhered) as is known in the art. The gas-delivery box 1005 is shown to include a plurality of gas-component channels 1003 (e.g., "gas sticks") populated with gas-delivery components (e.g., valves, mass-flow controllers, pressure transducers, pressure regulators, etc.).

The back-plane 1001 of the gas-delivery box 1005 is also shown to include a number of other components. The back-plane 1001, enclosure, printed circuit boards, electrical cables, pneumatic banks, and other components discussed herein (not all of which are necessarily shown) are each known in the art.

Figure 11A:
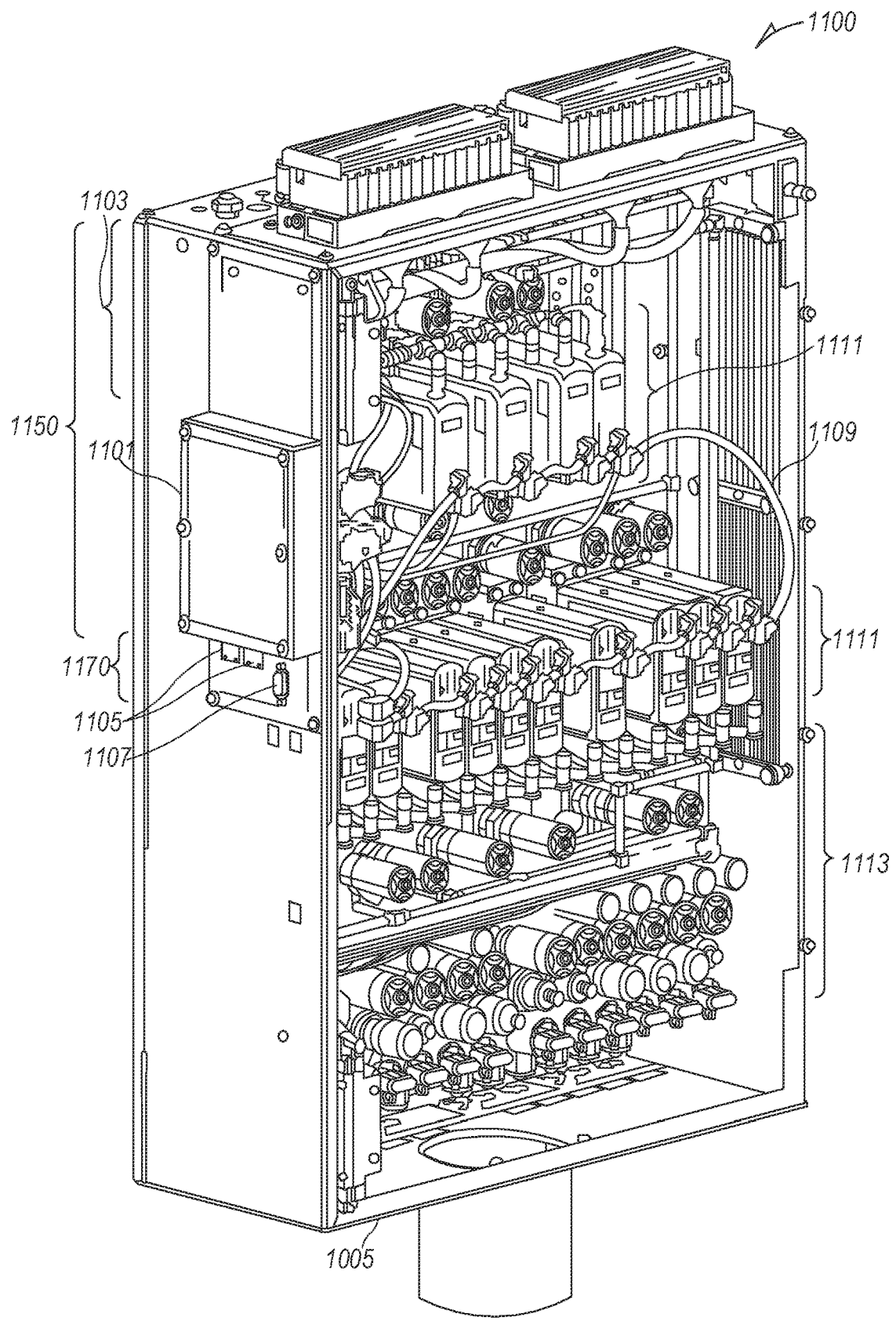
FIG. 11A shows a three-dimensional view of an exemplary embodiment of a gas-delivery box having an external EtherCAT node connection connected to a variety of gas-delivery components within the gas-delivery box.

FIG. 11A shows a three-dimensional view 1100 of an exemplary embodiment of the gas-delivery box 1005 having an external EtherCAT node connection 1150 connected to a variety of gas-delivery components within the gas-delivery box 1005. The three-dimensional view 1100 is also shown to include a number of MFCs 1111 and a number of gas-delivery components 1113 (e.g., lockout/tagout (LOTO) valves, pressure regulators, gas filters, two-port valves, three-port valves, etc.). Each of the number of MFCs is electrically coupled to by an MFC communications line 1109.

The external EtherCAT node connection 1150 is shown to include a EtherCAT connector region 1103 for communications between components within the gas-delivery box 1005 and a remote controller (not shown), an access port 1101 to allow access to a number of gas-delivery box internal communications components (shown and described in more detail with reference to FIG. 11B, below), and an interlock master connector region 1170.

The interlock master connector region 1170 is also shown to include, for example, connector ports 1105 for coupling to the interlock master, and an additional connector port 1107 for coupling to, for example, an external exhaust sensor (in a specific exemplary embodiment, the additional connector port 1107 may be a DB-9 port for digital and/or analog communications).

Figure 11B:
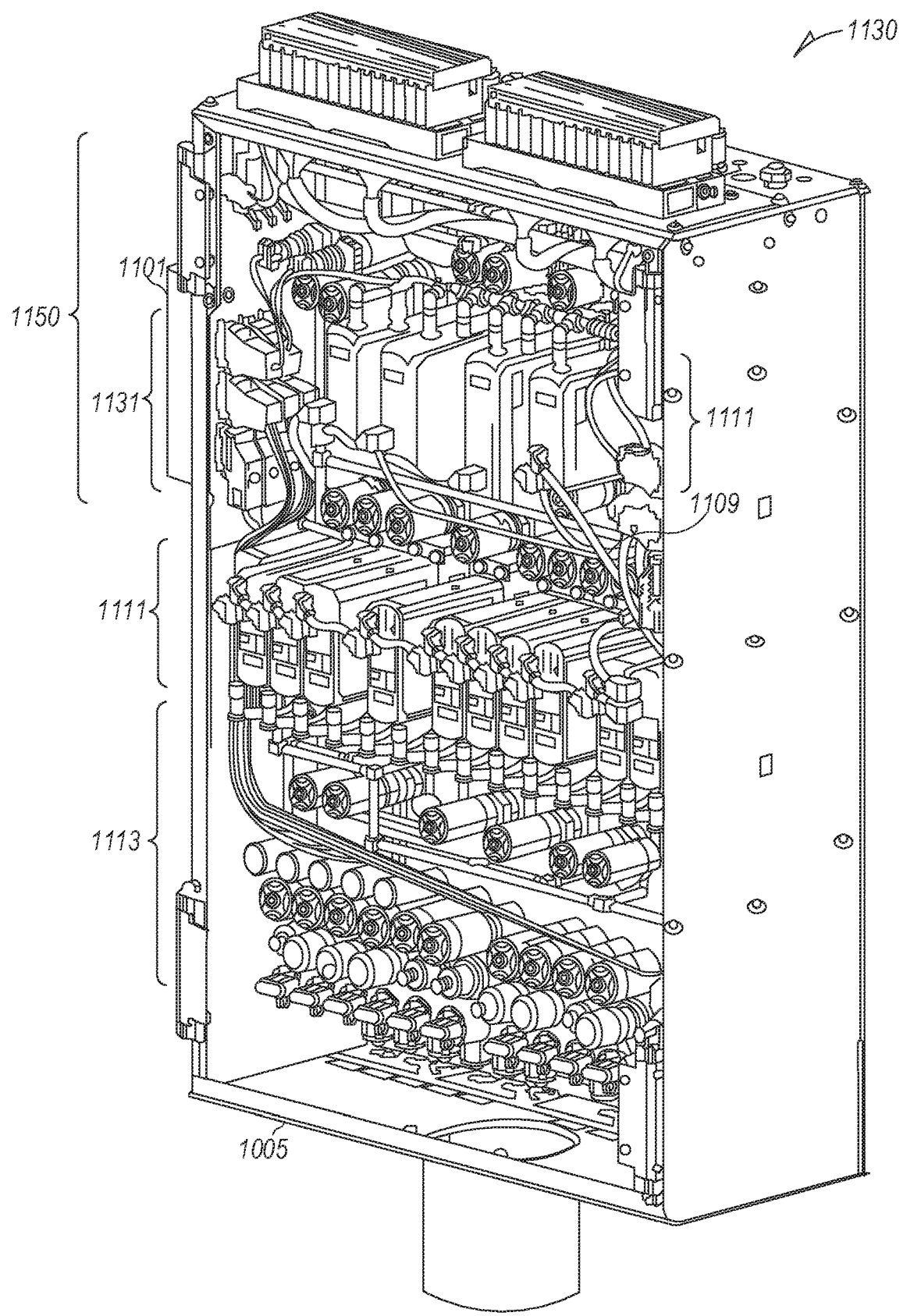
FIG. 11B shows another three-dimensional view of an exemplary embodiment of the gas-delivery box of FIG. 11A with another view of the variety of gas-delivery components within the gas-delivery box.

FIG. 11B shows another three-dimensional view 1130 of an exemplary embodiment of the gas-delivery box 1005 of FIG. 11A with another view of the variety of gas-delivery components within the gas-delivery box 1005. The three-dimensional view 1130 shows internal communications components 1131 within the gas-delivery box 1005, which as accessible from the access port 1101 of FIG. 11A. The internal communications components 1131 provide for digital and/or analog communications between a remote controller (not shown) and various ones of the gas-delivery components (e.g., MFCs 1111 and the number of gas-delivery components 1113) within the gas-delivery box 1005.

Figure 11C:
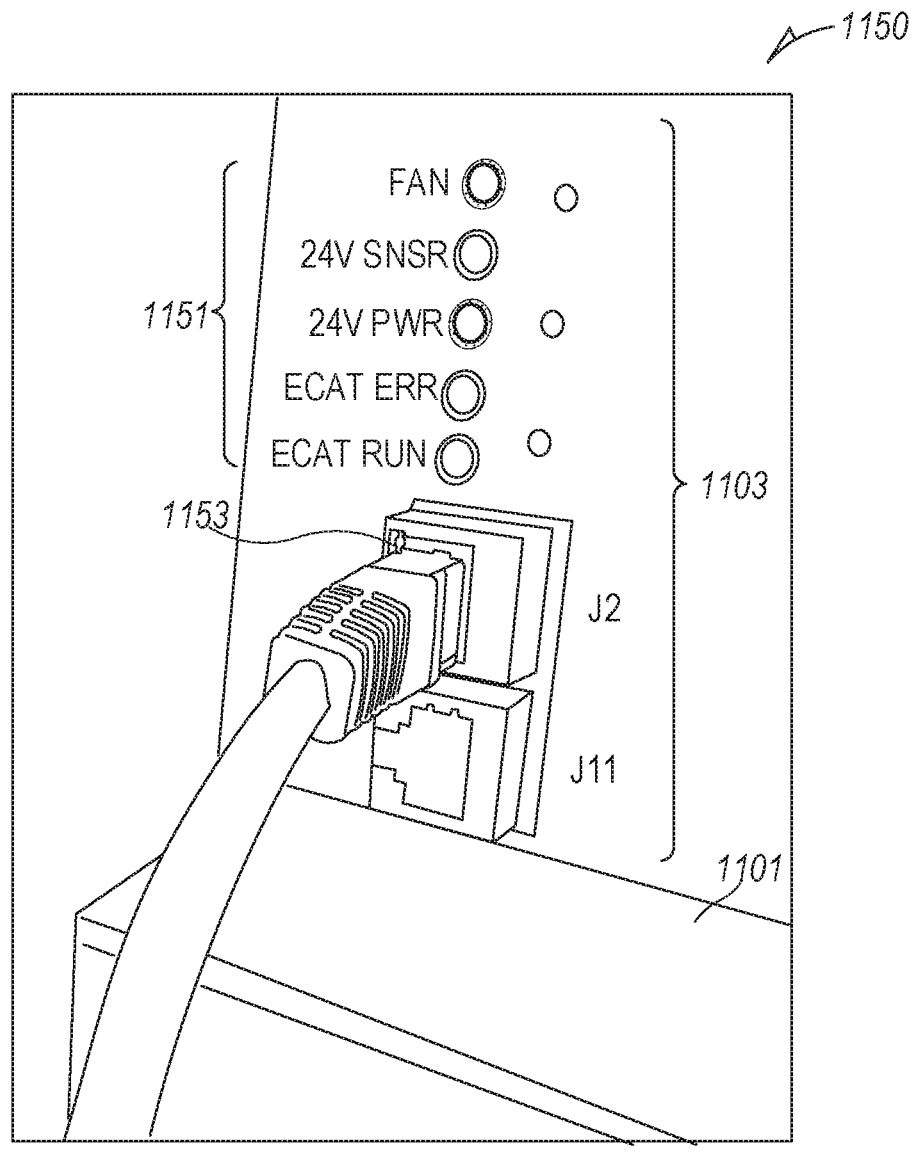
FIG. 11C shows an exemplary embodiment of a portion of the EtherCAT connector for system communications in accordance with FIG. 11A.

FIG. 11C shows an exemplary embodiment of a portion of the external EtherCAT node connection 1150 for system communications in accordance with FIG. 11A, including the EtherCAT connector region 1103. The EtherCAT connector region 1103 is shown to include, for example, a number of indicator lights 1151 (e.g., to verify power delivery, EtherCAT diagnostics, fan operation, etc.), and one or more EtherCAT connectors 1153 for communications between the system controller (not shown) and the gas-delivery box 1005 of FIGS. 10, 11A, and 11B. In a specific exemplary embodiment, the one or more EtherCAT connectors 1153 may comprise RJ-45 connectors, known in the art.

Figure 11D:
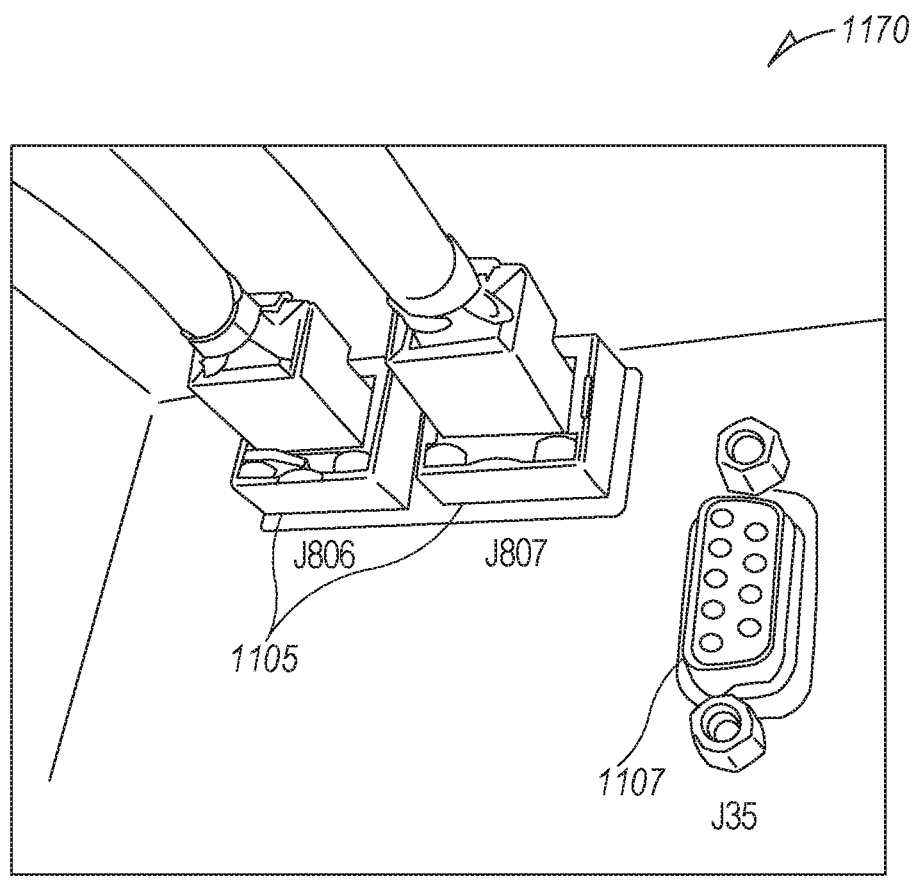
FIG. 11D shows an exemplary embodiment of another portion of the EtherCAT connector for system communications in accordance with FIG. 11A.

FIG. 11D shows an exemplary embodiment of another portion of the external EtherCAT node connection 1150 (see FIGS. 11A and 111B) including the interlock master connector region 1170, for system communications in accordance with FIG. 11A.

Machines with Instructions to Perform Various Operations

Figure 12:
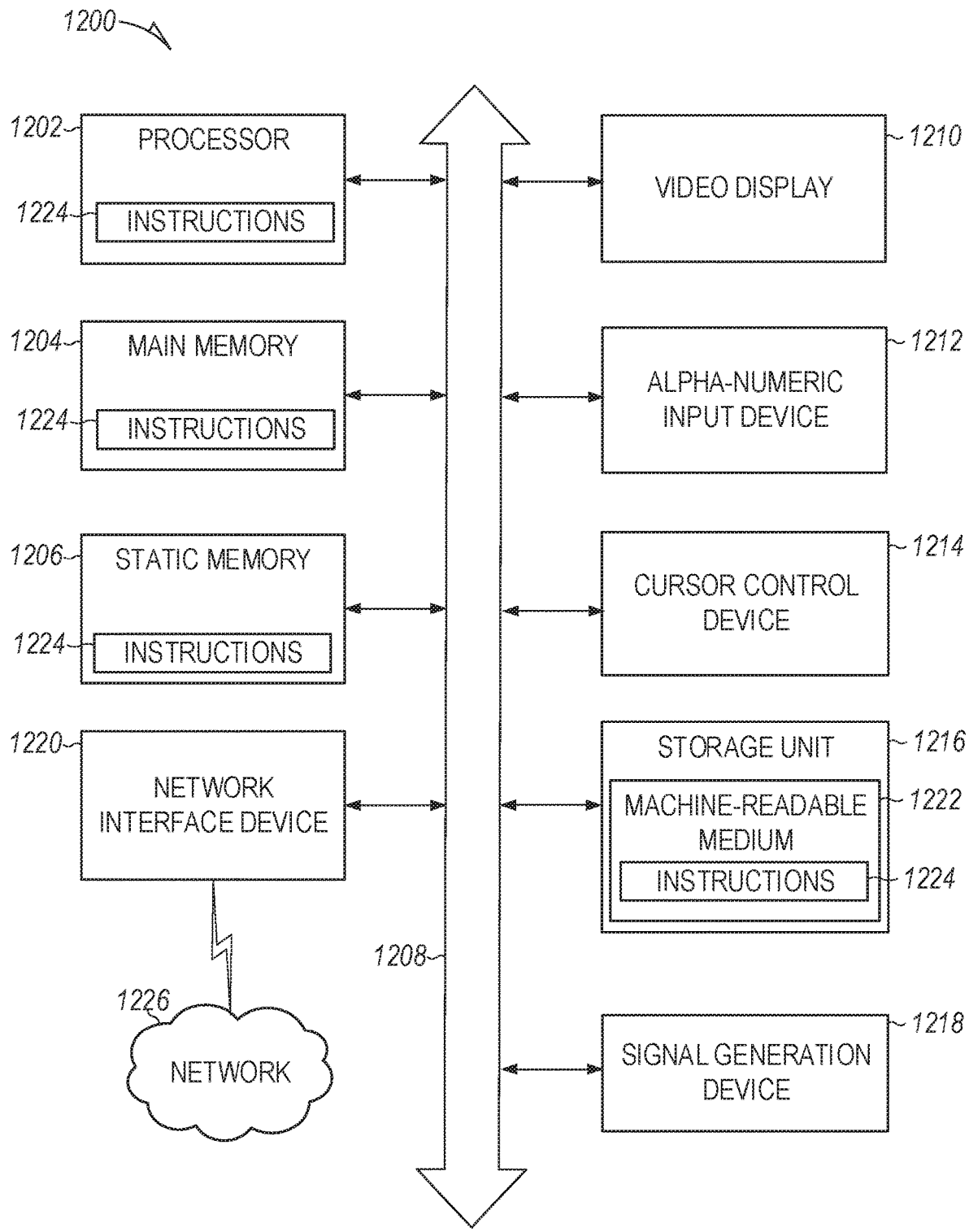
FIG. 12 shows a simplified block diagram of a machine in an example form of a computing system within which a set of instructions for causing the machine to perform any one or more of the methodologies and operations discussed herein may be executed.

FIG. 12 is a block diagram illustrating components of a machine 1200, according to some embodiments, able to read instructions from a machine-readable medium e.g., a non-transitory machine-readable medium, a machine-readable storage medium, a computer-readable storage medium, or any suitable combination thereof) and perform any one or more of the methodologies discussed herein. Specifically, FIG. 12 shows a diagrammatic representation of the machine 1200 in the example form of a computer system and within which instructions 1224 (e.g., software, a program, an application, an applet, an app, or other executable code) for causing the machine 1200 to perform any one or more of the methodologies discussed herein may be executed.

In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alpha-numeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 (e.g., a tangible and/or non-transitory machine-readable storage medium) on which is stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media (e.g., tangible and/or non-transitory machine-readable media). The instructions 1224 may be transmitted or received over a network 1226 via the network interface device 1220. For example, the network interface device 1220 may communicate the instructions 1224 using any one or more transfer protocols (e.g., hypertext transfer protocol (HTTP)).

In some embodiments, the machine 1200 may be a portable computing device, such as a smart phone or tablet computer, and have one or more additional input components (e.g., sensors or gauges). Examples of such additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 1200), such that the instructions, when executed by one or more processors of the machine (e.g., the processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1224 may further be transmitted or received over a network 1226 (e.g., a communications network) using a transmission medium via the network interface device 1220 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

As noted above, any gas-delivery box or gas panel can be controlled via a single EtherCAT interface as described above. The single EtherCAT interface greatly simplifies setup and test of the gas-delivery box or the gas panel. In various embodiments, the gas-delivery box can be configured and tested via one EtherCAT connection, thereby reducing the test equipment required and the problematic cabling and separate interface box or boxes of the prior art. The disclosed subject matter therefore allows easy integration into any gas-delivery box, such as is commonly coupled to a semiconductor processing tool, and can be pre-configured and tested so that the disclosed subject matter comprises a plug-and-play configuration that allows simple integration at the site of an end user Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. In various embodiments described herein, FPGAs that are pre-certified to SIL3 standards may be used.

A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware-module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other particulate matter sensor calibration system embodiments discussed herein. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A distributed interlock system, comprising:
a plurality of slave nodes each having an interface translation card and an interlock (ITLK) slave device; and
at least one master device being in electrical communication with the plurality of slave nodes and programmable to prevent any combination of sequences that are detrimental to human safety, the at least one master device being configured to provide command and operational signals to selected ones of the plurality of slave nodes, the at least one master device being further configured to evaluate signals received from the selected ones of the plurality of slave nodes in substantially real-time, the at least one master device having at least a preventative-interlocking portion configured to evaluate interlock conditions and prevent unsafe conditions prior to one or more command executions, related to the unsafe conditions, being transmitted to one or more of the plurality of slave nodes, based on a lookup table readable by the at least one master device, the lookup table being at least partially configured for the at least one master device to determine whether any combination of chemical sequences is detrimental to human safety.

2. The distributed interlock system of claim 1, wherein at least one of the master devices is configured as a dual-redundancy device, wherein components of the at least one master device are configured to perform the same tasks such that if a first redundancy module fails, a second redundancy module automatically takes over the tasks of the first redundancy module.

3. The distributed interlock system of claim 1, wherein the plurality of slave nodes is configured to synchronously sample input signals received from a tool and send the sampled signals to the at least one master device; and
the plurality of slave nodes is further configured to synchronously drive output signals subsequent to receiving results from the at least one master device, the received results being based on the input signals sent to the at least one master device.

4. The distributed interlock system of claim 1, further comprising a sequencer to analyze sequences of events based on one or more signals received from at least one of the plurality of slave nodes subsequent to receiving the one or more signals from a tool.

5. The distributed interlock system of claim 1, further comprising an interlock equation solver to evaluate interlock equations in substantially real-time, wherein the interlock equations are based on values stored in the lookup table.

6. The distributed interlock system of claim 1, wherein an interlock latency based on the evaluated interlock conditions is less than 1 millisecond and is independent of a number of interlock equations.

7. The distributed interlock system of claim 1, wherein all interlock calculations are centralized in the at least one master device.

8. The distributed interlock system of claim 1, wherein at least a portion of the plurality of the slave nodes of the distributed interlock system is coupled to components within a gas-delivery box.

9. The distributed interlock system of claim 8, further comprising an integral controller within the gas-delivery box that communicates to the distributed interlock system via an EtherCAT interface.

10. The distributed interlock system of claim 9, wherein each of the components within the gas-delivery box are configured to be tested through the EtherCAT interface.

11. The distributed interlock system of claim 9, wherein the integral controller of the gas-delivery box is one of the plurality of slave nodes to the at least one master device.

12. The distributed interlock system of claim 11, wherein the integral controller is in communication with the at least one master device for the gas-delivery box to operate.

13. The distributed interlock system of claim 1, wherein the interlock (ITLK) slave devices on each of the plurality of slave nodes communicate with components within one or more tools through an RS-485 interface.

14. A distributed interlock system, comprising:
a plurality of slave nodes each having an interface translation card and an interlock (ITLK) slave device;
a lookup table configured for the at least one master device to determine whether any combination of sequences is detrimental to at least one of human safety and machine safety and operation, either in a single tool or tool-to-tool;
the at least one master device configured to receive input signals from and provide output signals to one or more of the plurality of slave nodes, the at least one master device having at least a preventative-interlocking portion configured to evaluate interlock conditions and prevent unsafe conditions prior to one or more command executions, related to the unsafe conditions, being transmitted to one or more of the plurality of slave nodes, based on the lookup table, the lookup table being at least partially configured for the at least one master device to determine whether any combination of chemical sequences is detrimental to human safety.

15. The distributed interlock system of claim 14, further comprising:
a non-volatile memory device coupled to each of the master devices to store all interlock equations; and
a firmware device coupled to each of the master devices to execute operations.

16. The distributed interlock system of claim 14, further comprising a centralized interlock equation solver within the at least one master devices.

17. The distributed interlock system of claim 14, wherein at least a portion of the plurality of the slave nodes of the distributed interlock system is coupled to components within a gas-delivery box.

18. A dual-redundancy distributed interlock system, comprising:
a plurality of interlock slave devices; and
at least one master device in electrical communication with the plurality of interlock slave devices and programmable to prevent any combination of sequences that are detrimental to human safety, the at least one master device being configured to provide command and operational signals to selected ones of the plurality of interlock slave devices, the at least one master device being further configured to evaluate signals received from the selected ones of the plurality of interlock slave devices in substantially real-time, the at least one master device having at least a preventative-interlocking portion configured to evaluate interlock conditions and prevent unsafe conditions prior to one or more command executions, related to the unsafe conditions, being transmitted to one or more of the plurality of interlock slave devices, based on a lookup table readable by the at least one master device, the lookup table being at least partially configured for the at least one master device to determine whether any combination of chemical sequences is detrimental to human safety.

19. The dual-redundancy distributed interlock system of claim 18, wherein components of the dual-redundancy distributed interlock system are configured to perform the same tasks such that if a first redundancy module fails, a second redundancy module automatically takes over the tasks of the first redundancy module.

20. The dual-redundancy distributed interlock system of claim 18, wherein a first redundancy module drives output signals and output devices, and a second redundancy module reads back the output signals, compares the output signals with its own results, and shuts off the output signals if there is a mismatch between at least one of the output signals and the corresponding one of its own results within a predetermined limit.

* * * * *